(12) United States Patent
Kawahara et al.

(10) Patent No.: US 7,526,724 B2
(45) Date of Patent: Apr. 28, 2009

(54) DATA PROCESSING APPARATUS AND DATA PROCESSING METHOD

(75) Inventors: Minoru Kawahara, Kanagawa (JP); Takeshi Maruta, Kanagawa (JP)

(73) Assignee: Sony Corporation, Tokyo (JP)

( * ) Notice: Subject to any disclaimer, the term of this patent is extended or adjusted under 35 U.S.C. 154(b) by 713 days.

(21) Appl. No.: 10/620,085

(22) Filed: Jul. 15, 2003

(65) Prior Publication Data
US 2004/0015253 A1    Jan. 22, 2004

(51) Int. Cl.
G06F 3/00 (2006.01)
G06T 13/00 (2006.01)
G06T 15/00 (2006.01)
G06F 17/00 (2006.01)

(52) U.S. Cl. .................. 715/723; 345/474; 345/960; 700/94

(58) Field of Classification Search .......... 345/474, 345/960; 715/723; 700/94
See application file for complete search history.

(56) References Cited

U.S. PATENT DOCUMENTS

| | | | | | |
|---|---|---|---|---|---|
| 5,164,839 | A | * | 11/1992 | Lang ................... | 386/54 |
| 5,191,645 | A | * | 3/1993 | Carlucci et al. ............. | 715/723 |
| 5,206,929 | A | * | 4/1993 | Langford et al. ............ | 715/723 |
| 5,237,648 | A | * | 8/1993 | Mills et al. .................. | 715/723 |
| 6,226,296 | B1 | * | 5/2001 | Lindsey et al. .............. | 370/401 |
| 6,286,085 | B1 | * | 9/2001 | Jouenne et al. ............. | 711/162 |
| 6,631,522 | B1 | * | 10/2003 | Erdelyi ....................... | 725/53 |
| 2002/0057894 | A1 | | 5/2002 | Ishige | |
| 2003/0026592 | A1 | | 2/2003 | Kawahara et al. | |
| 2005/0185927 | A1 | * | 8/2005 | Kudou ........................ | 386/95 |

FOREIGN PATENT DOCUMENTS

JP    11 88821    3/1999

OTHER PUBLICATIONS

Casares et al. Simplifying video editing using metadata Symposium on Designing Interactive Systems Session: Section 03 ACM Press 2002 pp. 157-166.*

* cited by examiner

Primary Examiner—Rachna S Desai
Assistant Examiner—Andrea N Long
(74) Attorney, Agent, or Firm—Frommer Lawrence & Haug LLP; William S. Frommer

(57) ABSTRACT

A data processing apparatus is disclosed which processes audio visual (AV) data made up of video or audio data, the apparatus including: receiving means for receiving an edit command specifying how to edit the AV data; editing means for editing the AV data in accordance with the edit command; determining means for determining whether the edit command specifies copying of the AV data; and controlling means which, if the edit command is determined to specify the copying of the AV data, then transfers the AV data from a copy source to a copy destination without synchronizing the copy source and the copy destination in operation; and if the edit command is determined to specify an editing action other than the copying of the AV data, then transfers the unedited AV data to the editing means for the specified editing action, and transfers the edited AV data to the recording/reproducing means for storage therein, while synchronizing the editing means and the copy source and the copy destination in operation.

6 Claims, 22 Drawing Sheets

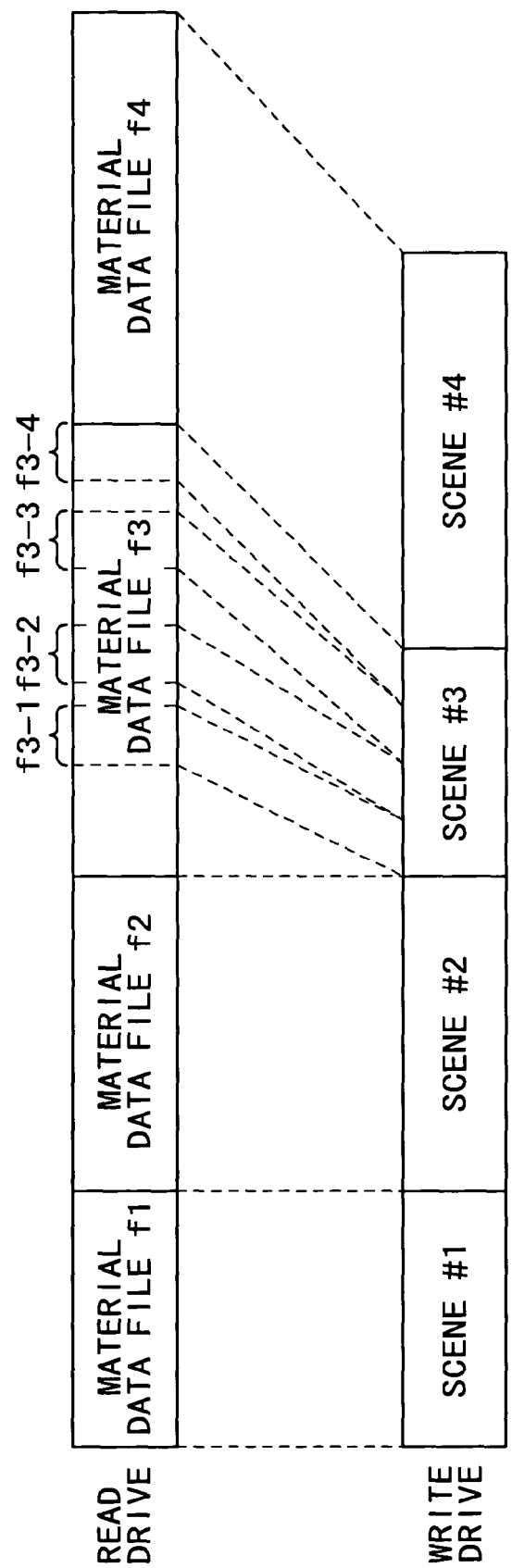

FIG. 8

EPL DATA FILE

```
epl(...epl unit ; defines an output picture.) {
    source(... specifies input materials.) ;
    ....
    ....
    ....
    do{specifies commands to be executed.
        get(...specifies time codes for a picture
            cut position.)
        put(...specifies time codes for a paste
            position.) ; // scene 1
        get(...specifies time codes for a picture
            cut position.)
        put(...specifies time codes for a paste
            position.) ; // scene 2
    }
    ....
    ....
    ....
    do{specifies commands to be executed.
        trsfm(...specifies picture processing.) ;
        get(...specifies time codes for a picture
            cut position.)
        put(specifies time codes for a paste
            position.) ;// scene 3
    }
    ....
    ....
    ....
    do{specifies commands to be executed.
        get(...specifies time codes for a picture
            cut position.)
        put(specifies time codes for a paste
            position.) ;// scene 4
    }
    ....
    ....
    ....
}                    //end of file
```

D8-1
D8-2
D8-3
D8-4
D8-5

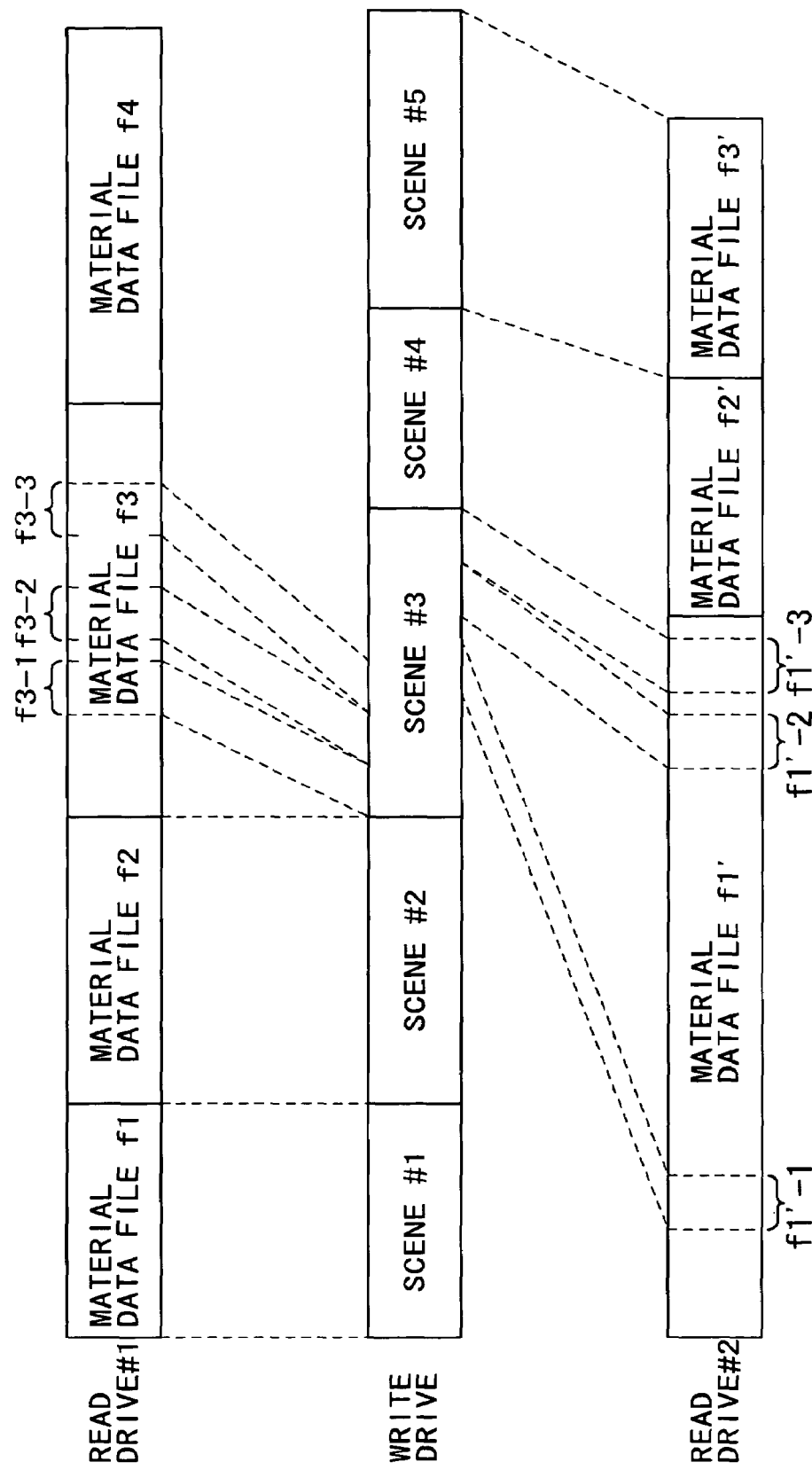

FIG. 11   EPL DATA FILE

```
epl(...epl unit ; define an output picture.) {
    source(... specifies input materials.) ;
    ....
    ....
    ....
    do{specifies commands to be executed.
        get(...specifies time codes for a picture
            cut position.)
        put(...specifies time codes for a paste
            position.) ; // scene 1
        get(...specifies time codes for a picture
            cut position.)
        put(...specifies time codes for a paste
            position.) ; // scene 2
    ....  }
    ....
    ....
    source(...specifies input materials.) ;
    ....
    do{specifies commands to be executed.
        trsfm(...specifies picture processing.) ;
        get(...specifies time codes for a picture
            cut position.)
        put(specifies time codes for a paste
            position.) ;// scene 3
    ....  }
    ....
    ....
    source(...specifies input materials.) ;
    ....
    do{specifies commands to be executed.
        trsfm(...specifies picture processing.) ;
        get(...specifies time codes for a picture
            cut position.)
        put(specifies time codes for a paste
            position.) ;// scene 3
    ....  }
    source(...specifies input materials.) ;
    ....
    ....
    do{specifies commands to be executed.
        get(...specifies time codes for a picture
            cut position.)
        put(specifies time codes for a paste
            position.) ;// scene 4
        get(...specifies time codes for a picture
            cut position.)
        put(specifies time codes for a paste
            position.) ;// scene 5

}
    ....
    ....
}                        //end of file
```

D11-1, D11-2, D11-3, D11-4, D11-5, D11-6, D11-7, D11-8

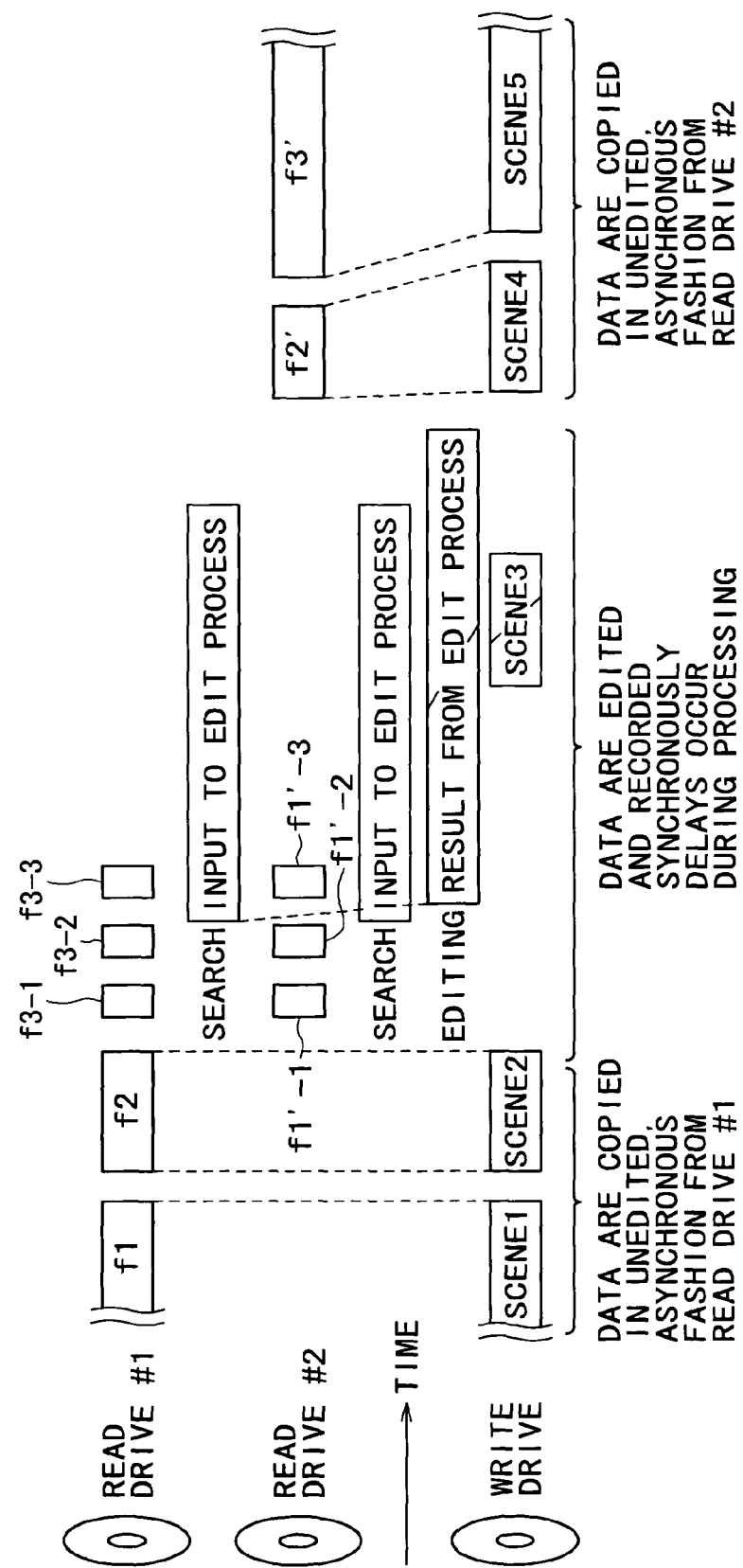

FIG. 14

EPL DATA FILE

```
epl(...epl unit ; defines an output picture.){
    source(... specifies input materials.) ;
    ....
    ....
    ....
        do{specifies commands to be executed.
D14-1       get(...specifies time codes for a picture
                cut position.)
            put(...specifies time codes for a paste
                position.) ; // scene 1
D14-2       get(...specifies time codes for a picture
                cut position.)
            put(...specifies time codes for a paste
                position.) ; // scene 2}
    ....
    ....
    ....
        do{specifies commands to be executed.
D14-3       trsfm(...specifies picture processing.) ;
            get(...specifies time codes for a picture
                cut position.)
            put(...specifies time codes for a paste
                position.) ; // scene 3
D14-4       get(...specifies time codes for a picture
                cut position.)
            put(...specifies time codes for a paste
                position.) ; // scene 3}
    ....
    ....
    ....
        do{specifies commands to be executed.
            get(...specifies time codes for a picture
                cut position.)
D14-5       put(specifies time codes for a paste
                position.);// scene 4}
    ....
    ....
    ....
    }                         //end of file
```

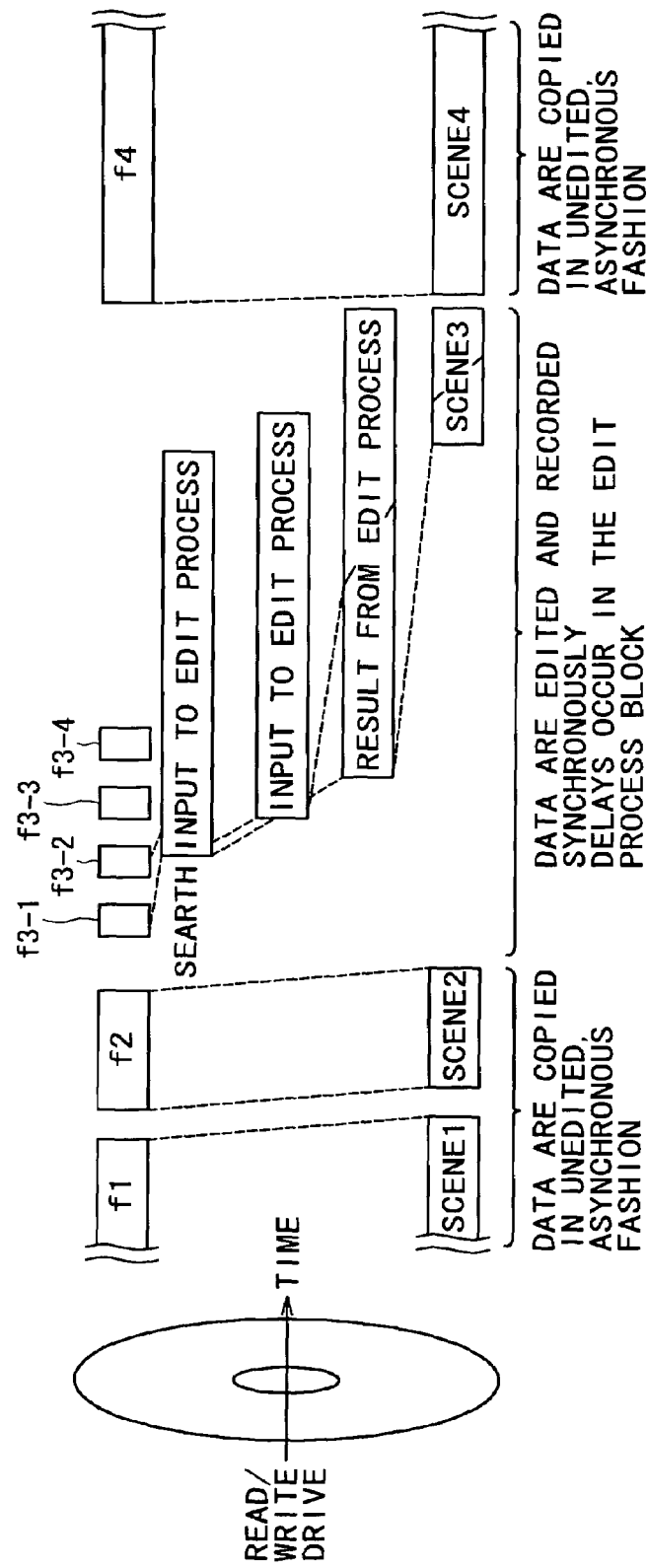

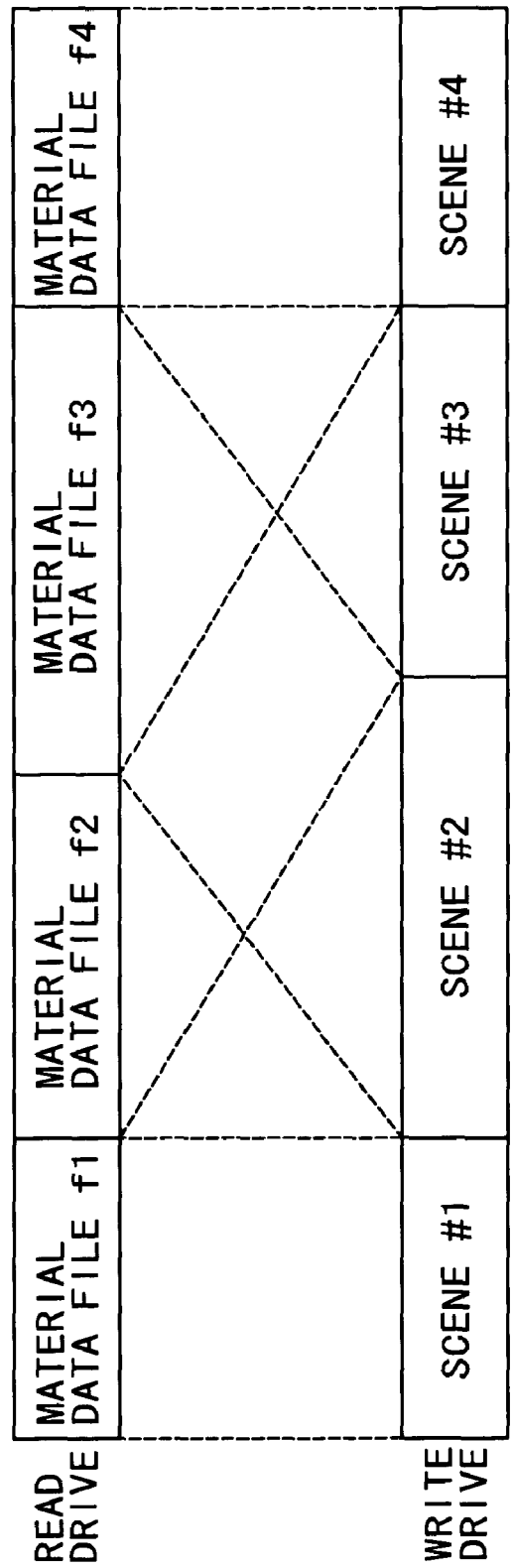

FIG. 17

EPL DATA FILE

```
epl(...epl unit ; defines an output picture.) {
    source(... specifies input materials.) ;
    . . . .
    . . . .
    . . . .
    . . . .
    . . . .
    . . . .
    . . . .
    . . . .
    do{specifies commands to be executed.
        get(...specifies time codes for a picture
            cut position.)
        put(...specifies time codes for a paste
            position.) ; // scene 1
        get(...specifies time codes for a picture
            cut position.)
        put(...specifies time codes for a paste
            position.) ; // scene 2
        get(...specifies time codes for a picture
            cut position.)
        put(...specifies time codes for a paste
            position.) ; // scene 3
        get(...specifies time codes for a picture
            cut position.)
        put(...specifies time codes for a paste
            position.) ; // scene 4
    }
    . . . .
    . . . .
    . . . .
    . . . .
    . . . .
    . . . .
}                           //end of file
```

D17-1: scene 1 block
D17-2: scene 2 block
D17-3: scene 3 block
D17-4: scene 4 block

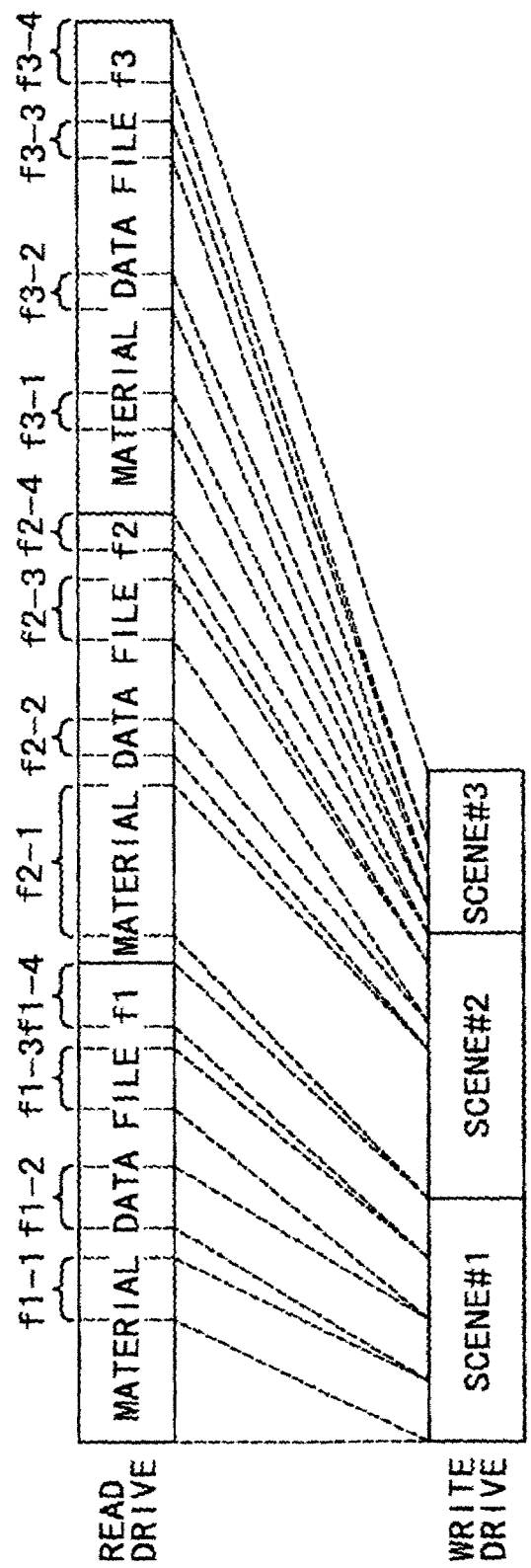

FIG. 20

EPL DATA FILE

```
epl(...epl unit ; defines an output picture.) {
    source(... specifies input materials.) ;
    ....
    ....
        do{specifies commands to be executed.
D20-1{      trsfm(...specifies picture processing.) ;
            get(...specifies time codes for a picture
D20-2{          cut position.)
            put(...specifies time codes for a paste
                position.) ; // scene 1}
        }
    ....
    ....
        do{specifies commands to be executed.
D20-3{      trsfm(...specifies picture processing.) ;
            get(...specifies time codes for a picture
D20-4{          cut position.)
            put(...specifies time codes for a paste
                position.) ; // scene 2}
        }
    ....
    ....
        do{specifies commands to be executed.
D20-5{      trsfm(...specifies picture processing.) ;
            get(...specifies time codes for a picture
D20-6{          cut position.)
            put(...specifies time codes for a paste
                position.) ; // scene 3}
        }
    ....
    ....
    ....
    ....
    }              //end of file
```

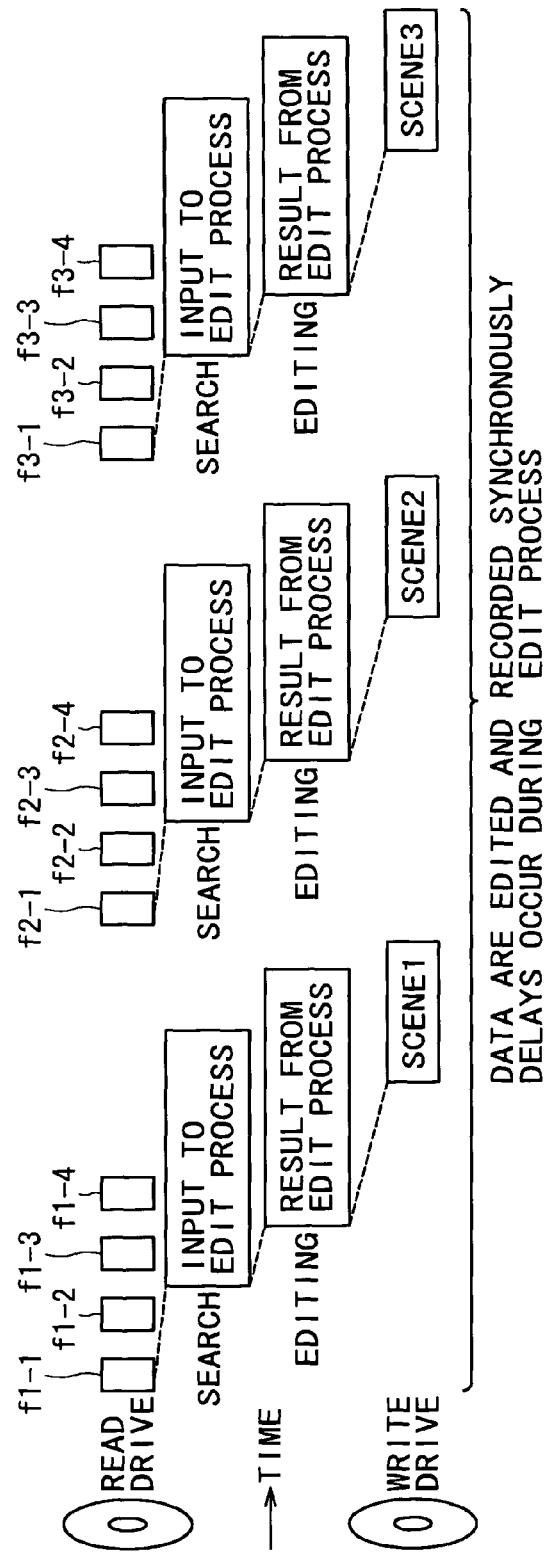

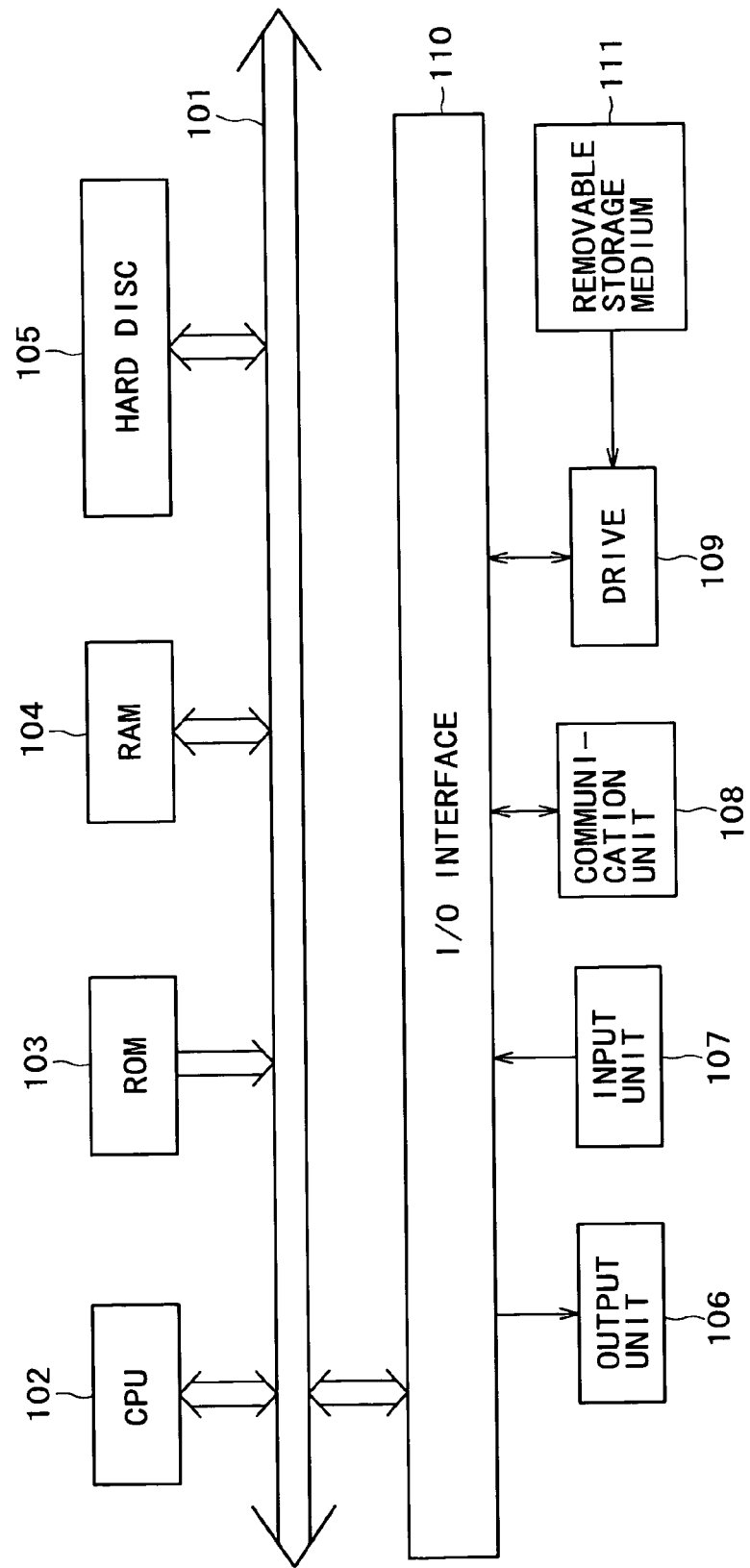

DATA PROCESSING APPARATUS AND DATA PROCESSING METHOD

BACKGROUND OF THE INVENTION

The present invention relates to a data processing apparatus and a data processing method.

In a conventional editing apparatus for editing video or audio data (called AV data hereunder), AV data are reproduced by at least one VTR (video tape recorder) for use as material to be edited (the reproduced AV data are called material data hereunder). After being edited, the material data are sent to and recorded by another VTR, whereby a complete package of AV data is produced (hereunder, called complete package data where appropriate).

The above-outlined editing which involves recording and reproducing AV data to and from tape-like storage media is called linear editing. On the other hand, recent years have witnessed the burgeoning of another kind of editing called nonlinear editing using disc-like storage media such as optical and magnetic discs. The new kind of editing has been made possible by the growing storage capacities and progressively dropping prices of these disc media.

Conventionally, whether the editing setup is designed for linear or nonlinear editing using tape or disc-like storage media respectively, the AV data are transferred synchronously between the recording/reproducing apparatuses for reproducing and recording AV data to and from the storage media on the one hand, and the editing apparatus on the other hand.

More specifically, the editing apparatus needs to synchronize with a recording/reproducing apparatus reproducing material data from a medium in order to search for in-points and out-points within the material data and to perform desired effects onto the data. The editing apparatus also needs to synchronize with another recording/reproducing apparatus which records the edited material data from the editing apparatus as complete package data.

It follows that even if the editing apparatus is capable of high-speed processing of AV data, the overall processing speed is restricted by the recording/reproducing apparatuses which, in reproducing unedited material data and recording the edited material data, may be operating at a significantly lower speed than the editing apparatus. Conversely, if the recording/reproducing apparatuses for reproducing unedited material data and recording the edited material data are capable of high-speed AV data processing, the overall processing speed is still limited by an editing apparatus working at an appreciably lower speed. Either way, it takes an inordinately long time to edit the AV data.

SUMMARY OF THE INVENTION

The present invention has been made in view of the above circumstances and provides a data processing apparatus, a data processing method, and a program for reducing the time required to edit AV data.

In carrying out the invention and according to one aspect thereof, there is provided a data processing apparatus for processing audio visual data made up of video or audio data, the data processing apparatus including:

receiving means for receiving an edit command specifying how to edit the audio visual data;

editing means for editing the audio visual data in accordance with the edit command;

determining means for determining whether the edit command specifies copying of the audio visual data; and controlling means which, if the edit command is determined to specify the copying of the audio visual data, then transfers the audio visual data from a copy source formed by one of at least one recording/reproducing means for recording or reproducing the audio visual data, to a copy destination formed by either the same or another recording/reproducing means, without synchronizing the two recording/reproducing means in operation; and if the edit command is determined to specify an editing action other than the copying of the audio visual data, then transfers the unedited audio visual data reproduced from one of the at least one recording/reproducing means to the editing means for the specified editing action, and transfers the edited audio visual data coming from the editing means to either the same or another recording/reproducing means for storage therein, while synchronizing the editing means and the two recording/reproducing means in operation.

According to another aspect of the invention, there is provided a data processing method for processing audio visual data made up of video or audio data, the data processing method including the steps of:

receiving an edit command specifying how to edit the audio visual data;

editing the audio visual data in accordance with the edit command using editing means;

determining whether the edit command specifies copying of the audio visual data;

if the edit command is determined to specify the copying of the audio visual data, then transferring the audio visual data from a copy source formed by one of at least one recording/reproducing means for recording or reproducing the audio visual data, to a copy destination formed by either the same or another recording/reproducing means, without synchronizing the two recording/reproducing means in operation; and if the edit command is determined to specify an editing action other than the copying of the audio visual data, then transferring the unedited audio visual data reproduced from one of the at least one recording/reproducing means to the editing means for the specified editing action, and transferring the edited audio visual data coming from the editing means to either the same or another recording/reproducing means for storage therein, while synchronizing the editing means and the two recording/reproducing means in operation.

According to a further aspect of the invention, there is provided a program for causing a computer to execute a data processing method for processing audio visual data made up of video or audio data, the data processing method including the steps of:

editing the audio visual data in accordance with an edit command specifying how to edit the audio visual data, using editing means;

determining whether the edit command specifies copying of the audio visual data;

if the edit command is determined to specify the copying of the audio visual data, then transferring the audio visual data from a copy source formed by one of at least one recording/reproducing means for recording or reproducing the audio visual data, to a copy destination formed by either the same or another recording/reproducing means, without synchronizing the two recording/reproducing means in operation; and if the edit command is determined to specify an editing action other than the copying of the audio visual data, then transferring the unedited audio visual data reproduced from one of the at least one recording/reproducing means to the editing means for the specified editing action, and transferring the edited audio visual data coming from the editing means to either the same or another recording/reproducing means for storage therein, while synchronizing the editing means and the two recording/reproducing means in operation.

Where the data processing apparatus, data processing method, and program of the invention are in use, the editing means edits audio visual data in accordance with an edit command specifying how to edit the audio visual data. Determination is then made as to whether or not the edit command specifies copying of the audio visual data. If the edit command is determined to specify the copying of the audio visual data, then the audio visual data are transferred from a copy source formed by one of at least one recording/reproducing means for recording or reproducing the audio visual data, to a copy destination formed by either the same or another recording/reproducing means, without the two recording/reproducing means being synchronized in operation. If the edit command is determined to specify an editing action other than the copying of the audio visual data, then the unedited audio visual data reproduced from one of the at least one recording/reproducing means are transferred to the editing means for the specified editing action, and the edited audio visual data coming from the editing means are transferred to either the same or another recording/reproducing means for storage therein, while the editing means and the two recording/reproducing means are being synchronized in operation.

Other objects, features and advantages of the invention will become more apparent upon a reading of the following description and appended drawings.

BRIEF DESCRIPTION OF THE DRAWINGS

FIG. 7 is a schematic view depicting typical material data files and a complete package data file;

FIG. 8 is a schematic view of a typical EPL data file;

FIG. 10 is a schematic view depicting other material data files and a complete package data file;

FIG. 11 is a schematic view of another EPL data file;

FIG. 12 is an explanatory view of processing based on the EPL data file of FIG. 11;

FIG. 14 is a schematic view of another EPL data file;

FIG. 15 is an explanatory view of processing based on the EPL data file of FIG. 14;

FIG. 16 is a schematic view depicting other material data files and a complete package data file;

FIG. 17 is a schematic view of another EPL data file;

FIG. 19 is a schematic view depicting other material data files and a complete package data file;

FIG. 20 is a schematic view of another EPL data file;

FIG. 21 is an explanatory view of processing based on the EPL data file of FIG. 20; and FIG. 22 is a block diagram showing a typical structure of a computer embodying the invention.

DETAILED DESCRIPTION OF THE PREFERRED EMBODIMENTS

Figure 1:
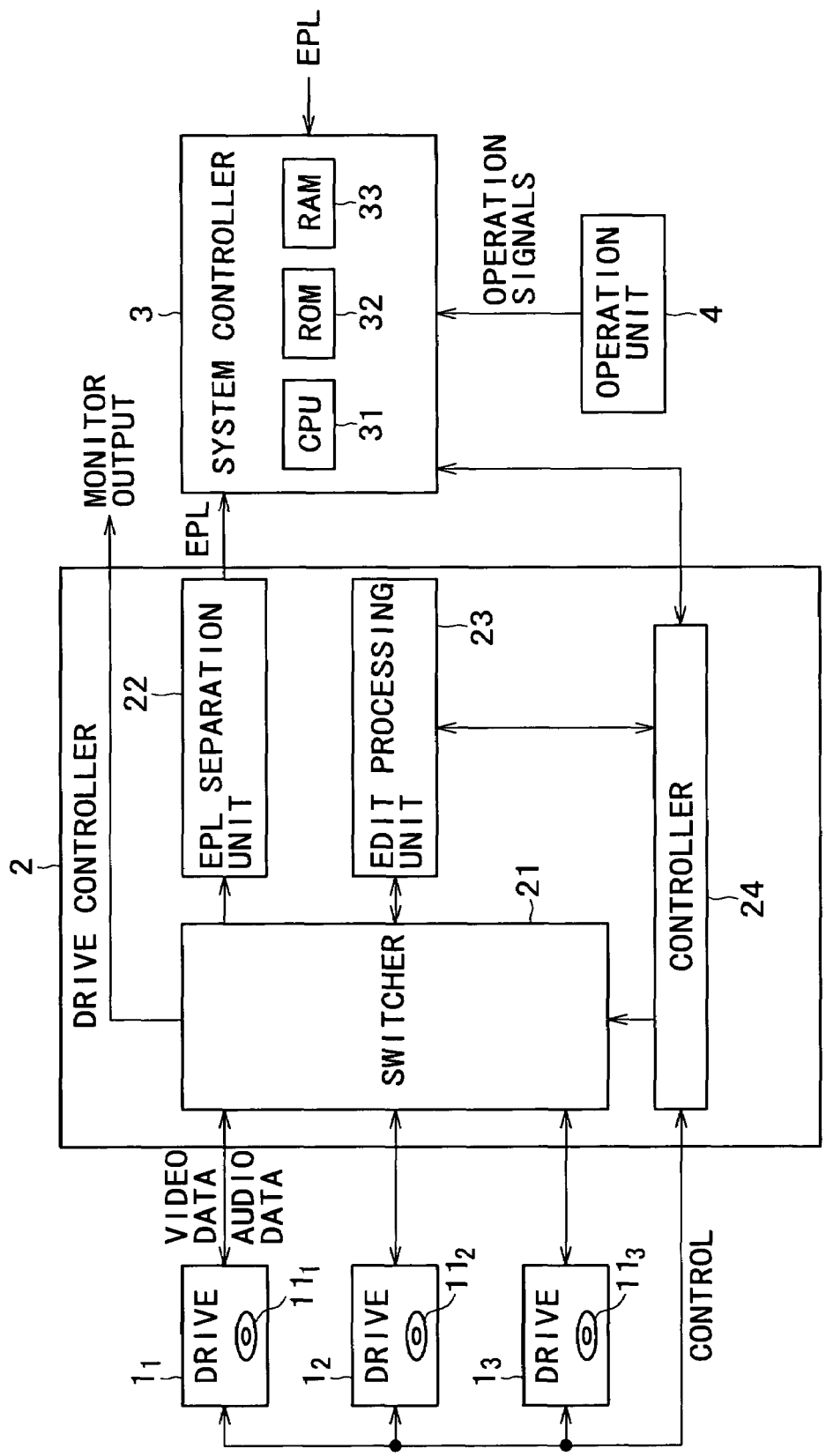
FIG. 1 is a block diagram showing a typical structure of a drive deck editor embodying the invention.

FIG. 1 outlines a typical structure of a drive deck editor embodying the invention. The drive deck editor is constituted by an editing apparatus that incorporates drives $1_1$ through $1_3$. The editing apparatus edits AV data, and the drives $1_1$ through $1_3$ serve as recording/reproducing apparatus for recording or reproducing AV data. This structure allows the drive deck editor to edit AV data without connecting to any external recording/reproducing apparatus.

Alternatively, the drive deck editor may not incorporate the drives $1_1$ through $1_3$ as recording/reproducing apparatus. In this case, external recording/reproducing apparatuses may be attached to the drive deck editor. However, it is preferred that the drive deck editor have the drives $1_1$ through $1_3$ or like recording/reproducing apparatuses installed inside. Such a drive-incorporating structure will facilitate designing of the drive deck editor and boost the processing speed of the editor.

If the recording/reproducing apparatuses were to be attached externally to the drive deck editor, then the editor would need a general-purpose interface for connection (i.e., use) with the external apparatus whose type are not known until connected. In operation, the drive deck editor exchanges AV data with the externally connected recording/reproducing apparatuses through the general-purpose interface, with synchronism always maintained between the editor and the connected apparatuses. That means the rate of AV data transfer between the drive deck editor and the externally attached apparatuses is limited by the specifications of the general-purpose interface. In addition, the drive deck editor is subject to design restrictions in that internal blocks of the editor must be designed to be compatible with general-purpose interfaces of the external recording/reproducing apparatuses.

By contrast, if the recording/reproducing apparatuses are incorporated in the drive deck editor, the designer of the editor is able to design as desired the interface between the incorporated recording/reproducing apparatuses on the one hand and the other internal blocks of the editor on the other hand. This frees the designer from having to consider general-purpose interfaces that would be required if the recording/reproducing apparatuses were to be attached externally. Furthermore, high-speed drives $1_1$ through $1_3$ may be adopted for built-in use as recording/reproducing apparatuses in the drive deck.

In the embodiment of the invention shown in FIG. 1, the drive deck editor incorporates the three drives $1_1$, $1_2$ and $1_3$. The drive $1_i$ (i=1, 2, 3) is illustratively capable of allowing an optical disc $11_i$ (i=1, 2, 3; disc-like storage medium) to be loaded and unloaded thereto and therefrom. The drive $1_i$ records AV data fed from a drive controller 2 to the loaded optical disc $11_i$ illustratively in the form of files under control of the controller 2. The drive $1_i$ also reproduces (reads out) under control of the drive controller 2, AV data held illustratively as files on the loaded optical disc $11_i$ and supplies the reproduced data to the controller 2.

The optical disc $11_i$ from which the drive $1_i$ reproduces AV data may also accommodate files of EPL (Edit Procedure List) data (called EPL data files, to be discussed later). The drive $1_i$ reproduces EPL data files from the disc in addition to AV data files and sends the reproduced data to the drive controller 2.

It is assumed here that the AV data recorded on the optical disc $11_i$ have been compressed by MPEG (Moving Picture Experts Group) or DV (Digital Video) methods. It should be noted, however, that the optical disc $11_i$ can also retain uncompressed AV data.

Although the setup of FIG. 1 shows the drive deck editor to have the three drives $1_1$, $1_2$ and $1_3$ inside, this is not limitative of the invention. The drive deck editor may alternatively incorporate one, two, four or more drives as well. Where a plurality of drives are incorporated in the drive deck, one drive may be used as a write-only drive and another as a read-only drive.

Although the setup of FIG. 1 shows the drive $1_i$ to be one capable of recording and reproducing data to and from the optical disc storage medium $11_i$, this is not limitative of the invention. Alternatively, the drive $1_i$ may be one for recording and reproducing data to and from a tape-like storage medium or a semiconductor memory. If the drive adopted for the editor is designed to record and reproduce data to and from the tape-like storage medium, the setup as a whole is capable of linear editing. If the adopted drive is one which permits random access to a disc-like storage medium or a semiconductor memory for write and read operations, then the setup is capable of nonlinear editing.

In the description that follows, the drives $1_1$ through $1_3$ are generically referred to as the drive 1 if there is no specific need for distinction between them. In like manner, the optical discs $11_1$ through $11_3$ are also referred to simply as the optical disc 11 unless otherwise required.

The drive controller 2 is made up of a switcher 21, an EPL separation unit 22, an edit processing unit 23, and a controller 24. With this structure, the drive controller 2 controls diverse operations including AV data exchanges with the drive 1, separation of EPL data, editing of AV data, and operation of the drive 1.

Under control of the controller 24, the switcher 21 receives an AV data file from a given drive $1_i$ and transfers the received file to another drive $1_j$ or to the same drive $1_i$. The switcher 21 also receives an AV data file from a given drive $1_i$ and transfers the received file to the edit processing unit 23. Furthermore, the switcher 21 receives an AV data file from the edit processing unit 23 and transfers the received file to a given drive $1_i$.

In addition, the switcher 21 is arranged to output to a display or speakers (not shown) the AV data sent from the drive 1 or from the edit processing unit 23. This arrangement allows the AV data to be output visually or audibly.

The drive controller 2 has a number of terminals: a terminal for admitting a component signal or a composite signal from the outside, an S terminal, a USB (Universal Serial Bus) terminal, an IEEE (The Institute of Electrical and Electronics Engineers) 1394-based terminal, and a LAN terminal. The input to and the output from these terminals are controlled by the switcher 21.

The EPL separation unit 22 separates EPL data files from the data transferred from the drive 1 to the switcher 21, and feeds the separated files to a system controller 3. As mentioned above, the drive 1 may reproduce EPL data files besides AV data files and send the reproduced EPL data files to the drive controller 2. Thus the switcher 21 receives not only the AV data files but also the EPL data files. The EPL separation unit 22 separates (i.e., detects) the EPL data files from the data received from the drive 1 and sends the detected files to the system controller 3.

The edit processing unit 23, under control of the controller 24, edits the AV data fed from the switcher 21 and sends the edited AV data to the switcher 21. The editing performed on the AV data by the edit processing unit 23 includes cuts, special effects such as wipe, and composite such as insertion of a telop.

Under control of the system controller 3, the controller 24 controls the switcher 21. Specifically, the controller 24 controls the switcher 21 in its switching operations such as transfer of AV data from one drive $1_i$ to another drive $1_j$, to the same drive $1_i$, or to the edit processing unit 23; and transfer of AV data from the edit processing unit 23 to one of the drives $1_1$ through $1_3$.

Also under control of the system controller 3, the controller 24 controls the edit processing unit 23 in its editing operations on AV data. Furthermore, under the direction of the system controller 3, the controller 24 controls the drive 1 in the recording and reproduction of AV data.

There are two kinds of control exerted by the controller 24 over the drive 1 and edit processing unit 23: synchronous control, and asynchronous control.

Under the synchronous control scheme, the controller 24 illustratively outputs synchronizing signals to the drive 1 and edit processing apparatus 23 to keep the two components operating in mutually synchronized fashion. Thus with the controller 24 in synchronous control, synchronism is maintained between the drive 1 and the edit processing unit 23 during their AV data transfer via the switch 21, or between a given drive $1_i$ and another drive $1_j$ or between the same drive $1_j$ during the AV data transfer through the switcher 21.

Under the asynchronous control scheme, the controller 24 does not output synchronizing signals to the drive 1 or edit processing unit 23 and thus lets the drives $1_1$ through $1_3$ operate asynchronously with each other. With the controller 24 in asynchronous control, AV data are transferred asynchronously between a given drive $1_i$ and another drive $1_j$ or between the same drive $1_i$ via the switcher 21.

Where the AV data reproduced by the drive 1 are transferred via the switcher 21 to the edit processing unit 23 for editing, or where the AV data edited by the edit processing unit 23 are transferred through the switcher 21 to the drive 1 for recording, the drive 1 and edit processing unit 23 need to operate in synchronism as in the case of the above-described conventional editing apparatus. In such cases, the controller 24 can exert only synchronous control; asynchronous control is not an option.

The system controller 3 is constituted by a CPU 31, a ROM 32, and a RAM 33, and controls the drive controller 2 among others. That is, the CPU 312 carries out programs held in the ROM 32 or RAM 33 primarily to control the drive controller 2 in its operations.

More specifically, the system controller 3 controls the controller 24 in the drive controller 2 in keeping with the following data and signals: EPL data from the EPL separation unit 22 in the drive controller 2, EPL data entered from the outside, and operation signals coming from an operation unit 4.

The operation unit 4 is operated by a user entering illustratively an edit command for specifying how to edit AV data. An operation signal corresponding to the user's operation is supplied to the system controller 3.

The edit commands specify the following: recording or reproduction of AV data, stopping of the recording or reproduction, a search for specific AV data, designation of in-points and out-points for use as cuts, and designation of special effects to be performed on AV data.

Figure 2:
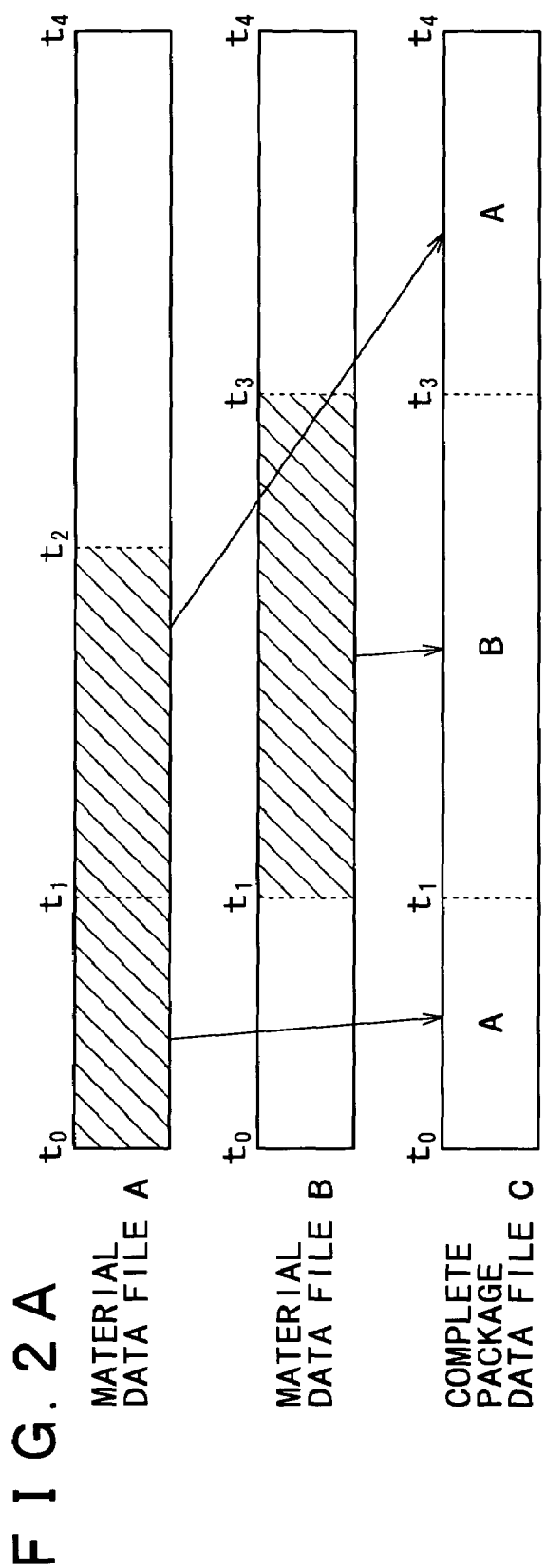
FIGS. 2A and 2B are explanatory views of EPL (Edit Procedure List) data.

Described below with reference to FIGS. 2A and 2B are EPL data used by the drive deck editor of FIG. 1. Suppose that, as shown in FIG. 2A, material data files A and B are being edited so as to prepare a complete package data file C.

In the example of FIG. 2A, the material data files A and B are each composed of AV data ranging from a time code to $t_0$ a time code $t_4$. The complete package data file C is constituted by the AV data having the time codes $t_0$ through $t_4$, the AV data being made up sequentially of material data A with the time codes $T_0$ through $T_1$ from the file A, material data B with the time codes $t_1$ through $t_3$ from the file B, and material data A with the time codes $t_1$ through $t_2$ from the file A.

In the complete package data file C, the material data A with the time codes $T_0$ through $T_1$ from the file A are given the time codes t0 through t1; the material data B with the time codes $t_1$ through $t_3$ from the file B are given the time codes t1 through t3; and the material A with the time codes $t_1$ through $t_2$ from the file A are given the time codes $t_3$ through $t_4$. The time codes $t_1$ through $t_4$ are subject to the relationship of $t_1 < t_2 < t_3 < t_4$.

The complete package data file C made of the definitive AV data is prepared by editing the material data files A and B as described above. In other words, the complete package data file C need not be actually prepared; it can be obtained virtually by use of the material data files A and B, and edit command information for specifying how to edit the files A and B into the file C.

The edit command information is constituted by EPL data. The EPL data by which to acquire the complete package data file C from the material data files A and B in FIG. 2A are provided illustratively in a format shown in FIG. 2B.

In the EPL data format of FIG. 2B, the first row "$t_0 \sim t_1$: $A(t_0 \sim t_1)$" means that the AV data with the time codes $t_0$ through $t_1$ are made of the AV data with the time codes $t_0$ through $t_1$ from the material data file A; the second row "$t_1 \sim t_3$: $B(t_1 \sim t_3)$" means that the AV data with the time codes $t_1$ through $t_3$ are composed of the AV data with the time codes $t_1$ through $t_3$ from the material data file B; and the third row "$t_3 \sim t_4$: $A(t_1 \sim t_2)$" means that the AV data with the time codes $t_3$ through $t_4$ are constituted by the AV data with the time codes $t_1$ through $t_2$ from the material data file A. It should be noted that what is described in FIG. 2B is intended only to explain EPL data conceptually, and the manner in which the description is made is not limitative of the invention.

The complete package data file C is obtained by editing the material data files A and B in accordance with the EPL data. That is, the EPL data file may be said to constitute a virtual complete package data file.

The drive deck editor in FIG. 1 allows one of the optical discs $11_1$ through $11_3$ to record complete package data which are obtained either by inputting edit commands through the operation unit 4 to edit the material data held on at least one of the optical discs $11_1$ through $11_3$, or by editing the material data from the discs in keeping with externally entered EPL data. The drive deck editor in FIG. 1 also allows one of the optical discs $11_1$ through $11_3$ to record complete package data which are acquired by editing the material data held on at least one of the optical discs $11_1$ through $11_3$ in accordance with the EPL data retained along with the material data on at least one of the optical discs $11_1$ through $11_3$.

Figure 3:
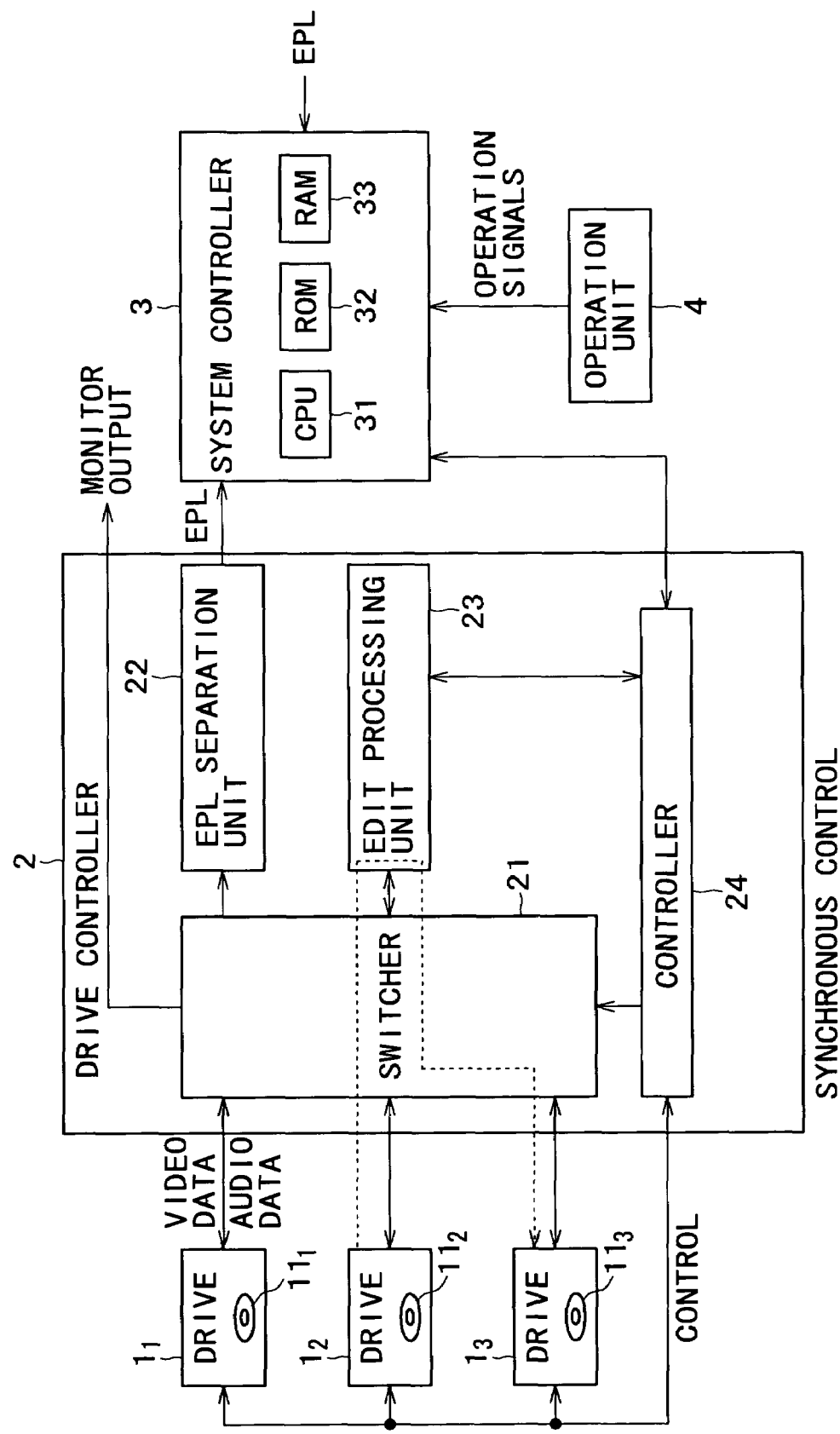
FIG. 3 is a block diagram showing a synchronous control setup.
Figure 4:
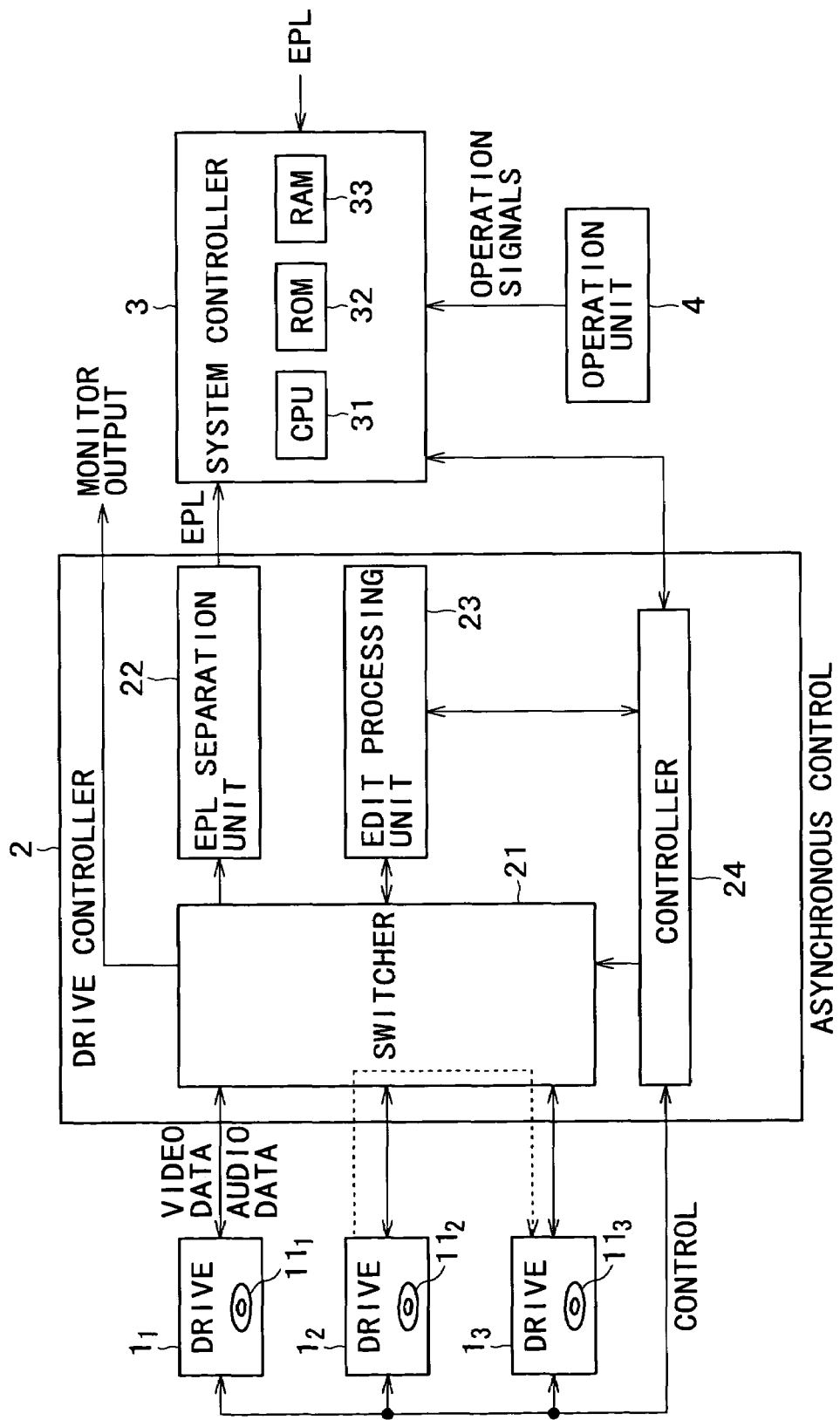
FIG. 4 is a block diagram showing an asynchronous control setup.

Explained below with reference to FIGS. 3 and 4 is a typical flow of AV data through the drive deck editor in FIG. 1. Where the AV data held as material data on the optical disc 11 in the drive 1 are subject to editing processes such as cuts or special effects, the material data reproduced by the drive 1 from the optical disc 11 are supplied through the switcher 21 to the edit processing unit 23, as indicated by broken lines in FIG. 3. The material data thus supplied are edited by the edit processing unit 23. The edited material data are fed through the switcher 21 to the drive 1 where the data are recorded to the optical disc 11.

In the setup of FIG. 3, the drive $1_2$ reproduces material data from the loaded optical disc $11_2$. The reproduced material data are edited by the edit processing unit 23. The edited material data are recorded by the drive $1_3$ to the loaded optical disc $11_3$.

Where the edit processing unit 23 edits the material data, the controller 24 ensures synchronism between the unit 23 and the drive $1_2$ by which the unedited material data are reproduced, as well as between the edit processing unit 23 and the drive $1_3$ by which the edited material data are recorded. In this case, the drive $1_2$, drive $1_3$ and edit processing unit 23 operate in synchronous relation to one another regardless of any one of them being capable of operating at a higher speed than the rest. It follows that the processing speed of the setup as a whole is equal to or less than a maximum processing speed of the slowest of the three components.

Although the setup of FIG. 3 shows the drive $1_2$ reproducing the unedited material data, this is not limitative of the invention. Any one or more of the drives $1_1$ through $1_3$ may reproduce the unedited material data. Whereas the setup of FIG. 3 shows the drive $1_3$ recording the edited material data to the loaded disc, any one or more of the drives $1_1$ through $1_3$ may record the edited material data. That means reproduction of the unedited material data and recording of the edited material data may be carried out either by different drives among the drives $1_1$ through $1_3$ or by the same drive.

It may be desired that the AV data held as material data on the optical disc 11 loaded in the drive 1 are copied unedited from there to another disc. In such a case, the material data reproduced from the optical disc 11 in the drive 1 acting as a copy source are supplied through the switcher 21 to the drive 1 which serves as a copy destination and which records the supplied data to the optical disc 11 therein, as indicated by broken lines in FIG. 4. It should be noted that the data to be copied do not pass through the edit processing unit 23.

In the setup of FIG. 3, the drive $1_2$ acts as the copy source and the drive $1_3$ as the copy destination. The source drive $1_2$ reproduces the material data from the optical disc $11_2$ therein, and the destination drive $1_3$ records the reproduced and supplied material data to the optical disc $11_3$ inside.

Where the material data are copied between the drives $1_2$ and $1_3$ without being fed through the edit processing unit 23, the controller 24 does not ensure synchronism between the source drive $1_2$ and the destination drive $1_3$. Instead, the controller 24 allows the two drives to carry out the copy operation in asynchronous relation with each other. In this case, the drives $1_2$ and $1_3$ operating asynchronously can execute their processing at their respective maximum speeds. This contributes to providing overall high-speed processing.

Although the setup of FIG. 4 shows the drive $1_2$ operating as the copy source and the drive $1_3$ as the copy destination, this is not limitative of the invention. Any drives from among the drives $1_1$ through $1_3$, either different or the same, may serve as the copy source and copy destination.

How the system controller 3 of FIG. 1 operates will now be described with reference to the flowchart of FIG. 5. The system controller 3 starts operating illustratively when supplied with an EPL data file either from the EPL separation unit 22 or from the outside.

Figure 5:
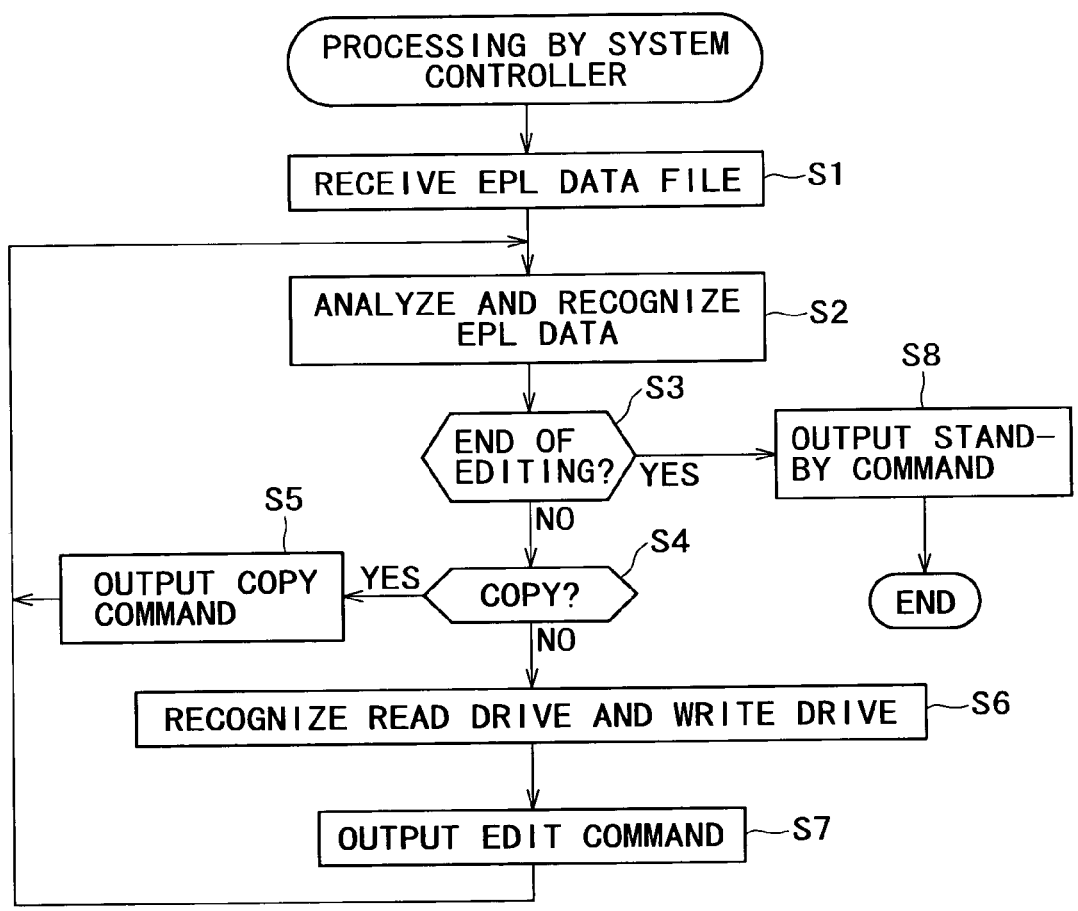
FIG. 5 is a flowchart of steps in which a system controller of the embodiment operates.

In step S1 of FIG. 5, the system controller 3 receives the supplied EPL data file. In step S2, the system controller 3 analyzes a set of EPL data described in the EPL data file received in step S1. The analysis allows the system controller 3 to recognize an edit command constituted by the EPL data.

In step S3, the system controller 3 checks to see whether the edit command specifies an end of editing. If in step S3 the edit command is not determined to designate the end of editing, step S4 is reached. In step S4, the system controller 3 checks to see if the edit command specifies copying of a material data file.

If in step S4 the edit command is determined to designate copying of the material data file, step S5 is reached. In step S5, the system controller 5 outputs a copy command to the drive controller 2 (i.e., to its controller 24) ordering the latter to copy the material data file. From step S5, control is returned to step S2. In step S2, the system controller 3 again reads EPL data subsequent to the data analyzed in the previous step S2 (e.g., the next line or the next set of EPL data) and analyzes the data. The subsequent steps are then repeated.

Where the edit command designates copying of a material data file, the command includes information (e.g., drive letters) for specifying a copy source drive 1 and a copy destination drive 1, as well as information for specifying the material data file to be copied (e.g., a file name). The system controller 3 embeds these kinds of information in the copy command before outputting the command.

In this specification, the word "copy" or "copying" refers to a simple duplicating operation of a file or files by computer. In other words, the copying as used in this specification signifies that an entire file is duplicated by computer without consideration of any data content in the file. For example, the copy or copying as meant in this specification does not include the act of making AV data between one time code and another time code in a first file into a second file, or the act of transferring that portion of AV data from the first file into part of a third file. That is because the time codes need to be known first, which requires referencing the content of the file with the AV data recorded therein. Any copy operation requiring references to the file content is not included in the act of copying as meant in this specification.

If in step S4 the edit command is not determined to designate copying of the material data file, i.e., if the edit command is determined to specify some other editing process on the material data in the edit processing unit 23, then step S6 is reached. In step S6, the system controller 3 recognizes from among the drives $1_1$ through $1_3$ two drives: a drive that reproduces the unedited material data from a disc (i.e., the drive loaded with the optical disc 11 retaining the unedited material data; called the read drive hereunder where appropriate), and a drive that records the edited material data to a disc (called the write drive hereunder where appropriate).

If the edit command is one that causes the edit processing unit 23 to perform some edit process on the material data, that command includes three kinds of information: information for specifying the drive 1 that reproduces the material data to be edited (i.e., read drive), information for specifying the drive 1 that records the edited material data (i.e., write drive), and information for designating the target material data to be edited (e.g., the name of the file containing the material data in question, and time codes pointing to a starting point and an end point of the extent over which the material data are recorded). In step S6, the system controller 3 recognize the read drive and write drive on the basis of these kinds of information.

The read drive that reproduces a material data file is a copy source drive, and the write drive that records the reproduced material data file is a copy destination drive. In the description that follows, the read drive and the copy source drive may be used interchangeably where appropriate, and the write drive and the copy destination drive may also be used interchangeably.

Step S6 is followed by step S7 in which the system controller 3 outputs an edit command ordering the drive controller 2 (i.e., its controller 24) to execute the edit process designated by the command. From step S7, control is returned to step S2. In step S2, the system controller 3 again reads a set of EPL data subsequent to the data analyzed in the previous step S2 and analyzes the data. The subsequent steps are then repeated. The edit command output by the system controller 3 to the drive controller 2 includes information for specifying a write drive, a read drive, and target material data to be edited.

If in step S3 the edit command is determined to designate an end of editing, step S8 is reached. In step S8, the system controller 3 outputs a standby command to the drive controller 2 ordering the latter to remain in standby mode. Following step S8, the system controller 3 terminates its processing.

In the example of FIG. 5, the system controller 3 was shown controlling the drive controller 2 in accordance with EPL data. Alternatively, the system controller 3 may control the drive controller 2 in keeping with operation signals entered by the user operating the operation unit 4.

How the drive controller 2 in FIG. 1 works will now be described by referring to the flowchart of FIG. 6. The drive controller 2 starts operating illustratively when supplied with a command from the system controller 3.

Figure 6:
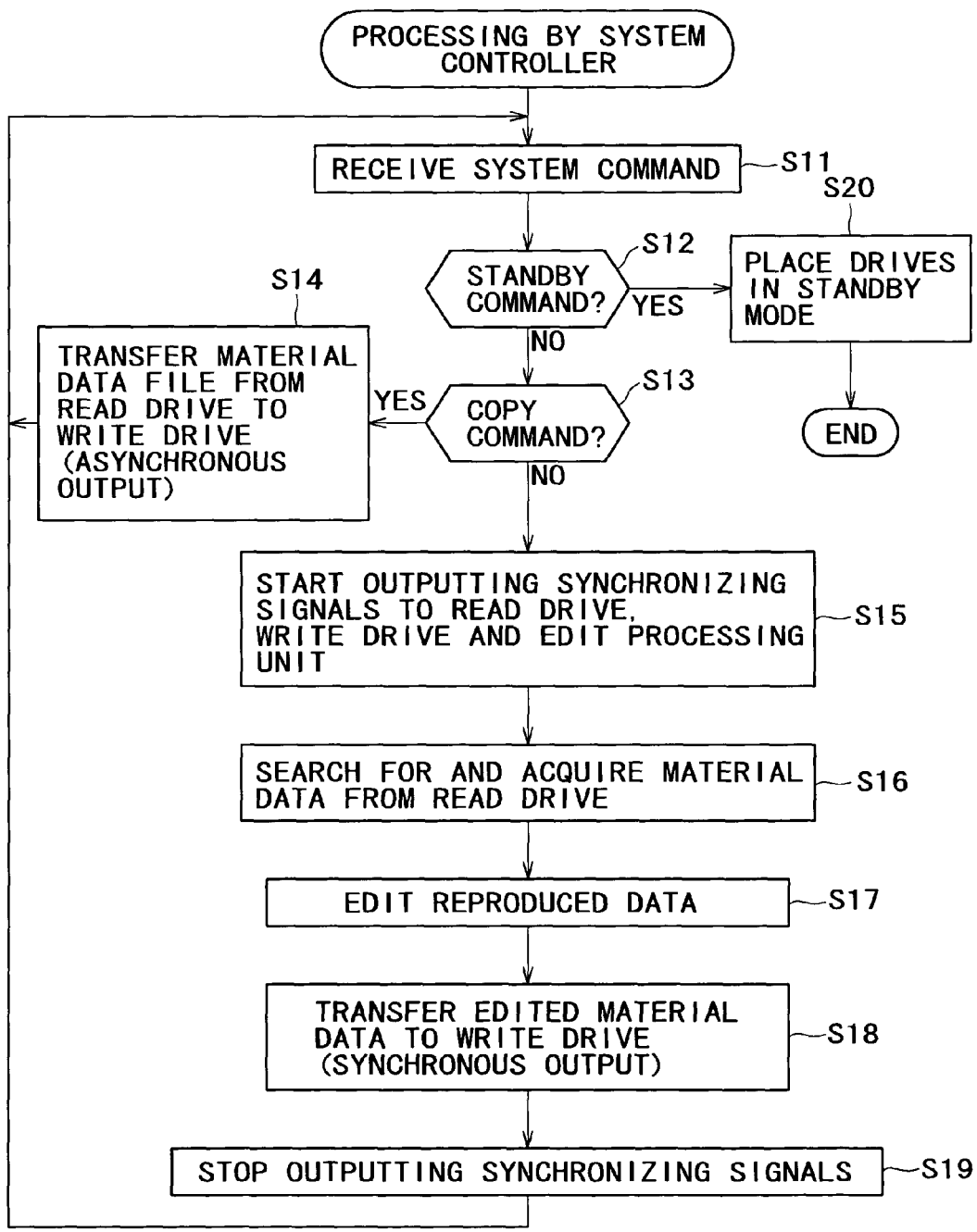
FIG. 6 is a flowchart of steps in which a drive controller of the embodiment operates.

In step S11 of FIG. 6, the controller 24 in the drive controller 2 receives a command from the system controller 3. In step S12, the drive controller 24 checks to see if the command received from the system controller 3 in step S11 is a standby command.

If in step S12 the command from the system controller 3 is not determined to be a standby command, step S13 is reached. In step S13, the controller 24 checks to see if the command from the system controller 3 is a copy command.

If in step S13 the command from the system controller 3 is determined to be a copy command, step S14 is reached. In step S14, the controller 24 controls the read drive, write drive, and switcher 21 in such a manner that the target material data file designated by information in the copy command is transferred from the read drive to the write drive.

Under control of the controller 24, the switcher 21 switches drive I/O operations so that AV data to be reproduced by the read drive will be output to the write drive. The read drive then reproduces and outputs the target material data file to be copied. The material data file reproduced by the read drive is transferred to the write drive through the switcher 21. The write drive records the transferred material data file.

In the case above, the read drive and write drive operate in asynchronous relation with each other. That means the read drive can reproduce the material data file at the maximum speed of the drive in a high-speed read operation, and the write drive can record the received material data file at the maximum speed of the drive in a high-speed write operation. When the read and write drives can perform their processes at their respective maximum speeds, the entire copy operation of the material data file can be accomplished at high speed.

After step S14, the controller 24 waits for the next command to be sent from the system controller 3. When the next command is received in step S11, the subsequent steps are repeated.

If in step S13 the command from the system controller 3 is not determined to be a copy command, i.e., if the command is determined to be an edit command (neither the standby command nor the copy command), then step S15 is reached. In step S15, the controller 24 starts outputting synchronizing signals to the edit processing unit 23 as well as to the read and write drives designated by information included in the edit command. From step S15, control is passed on to step S16. It should be noted that in step S15, the read and write drives as well as the edit processing unit 23 start operating in synchronous relation with one another once they start receiving the synchronizing signals from the controller 24.

In step S16, the controller 24 controls the read drive and switcher 21 in such a manner that the target material data file designated by information in the edit command is reproduced and supplied to the edit processing unit 23 via the switcher 21. Also in step S16, the edit processing unit 23 acquires the material data file to be edited by searching for it through the supplied files. Step S16 is followed by step S17.

In step S17, the controller 24 causes the edit processing unit 23 to perform the edit process (including effects) as per the edit command on the material data obtained in step S16. In step S18, the controller 24 controls the write drive and switcher 21 in such a manner that the material data edited by the edit processing unit 23 are fed through the switcher 21 to the write drive which in turn records the edited material data.

In steps S16 through S18, the read drive, write drive, and edit processing unit 23 operate in synchronous relation with one another in keeping with the synchronizing signals coming from the controller 24. It follows that each of the read drive, write drive and edit processing unit 23 operates at a lower speed than the maximum processing speed it is capable of when working alone.

From step S18, control is passed on to step S19 in which the controller 24 stops outputting the synchronizing signals to the read drive, write drive and edit processing unit 23. Following step S19, the controller 24 waits for the next command to be sent from the system controller 3. When the next command is received in step S11, the subsequent steps are repeated.

If in step S12 the command from the system controller 3 is determined to be a standby command, step S20 is reached. In step S20, the controller 24 places the drives 1$_1$ through 1$_3$ in standby mode, and terminates its processing.

As described, when the command coming from the system controller 3 is determined to be an edit command, the controller 24 causes the read drive, write drive and edit processing unit 23 to operate synchronously as in conventional editing apparatuses. When the command from the system controller 3 is determined to be a copy command, the controller 24 allows the read drive and write drive to operate asynchronously to copy the target material data file at high speed. The inventive setup takes an appreciably shorter time in its high-speed copy operation than conventional editing apparatuses and thereby contributes to reducing the editing time as a whole.

In the example of FIG. 6, the read drive, write drive and edit processing unit 23 were shown operating synchronously when the command from the system controller 3 turned out to be an edit command. Alternatively, the read drive, write drive and edit processing unit 23 may be allowed normally to operate synchronously; only when the command from the system controller 2 is determined to be a copy command may the read drive and write drive be arranged to operate in asynchronous relation with each other.

If the AV data supplied to the edit processing unit 23 are found encoded, the unit 23 decodes the supplied data, edits the decoded data, and again encodes the edited data before outputting the resulting data.

Below is a more detailed description, with reference to FIGS. 7 through 21, of how the drive deck editor of FIG. 1 operates in accordance with EPL data. Suppose now that an optical disc 11 loaded in a read drive has material data files f1 through f4 recorded thereon, and that a write drive is to record to a loaded optical disc 11 the complete package data composed of AV data including: a scene #1 from the material data file f1; a scene #2 from the material data f2; a scene #3 made of material data items f3-1, f3-2, f3-3 and f3-4 from four segments of the material data file f3; and a scene #4 from the material data file f4. In such a case, an EPL data file such as one shown in FIG. 8 is utilized.

The EPL data file is constituted by EPL data including a number of commands. A command "epl( )" designates a complete package data file. Described in the parentheses is information specifying the complete package data file in arguments (e.g., a file name is described).

A command "source( )" designates material data files. Described in the parentheses is information specifying in arguments the material data files to be used (e.g., file names are described).

A command "do{ }" is used to describe in its curly brackets commands for processing the material data. In the example of FIG. 8, three commands are provided to process the material data: get( ), put( ), and trsfm( ).

The command "get( )" acquires material data from a material data file. Described as needed in the parentheses is information specifying in arguments the position of the material data to be obtained from the material data file (e.g., time codes are described).

The command "put( )" pastes into the complete package data file the material data acquired by the command "get( )." Described as needed in the parentheses is information specifying in arguments that position in the complete package data file to which the material data are pasted (e.g., time codes are described).

The command "trsfm( )" specifies details of an edit process to be performed on the material data by the edit processing unit 23. The parentheses contain a description of arguments designating the specific editing details.

The EPL data file may include a comment. Illustratively, a text written following two slashes "//" is interpreted as a command.

The EPL data file includes the commands as described above. Of these commands, the command "trsfm( )" designates the edit process to be carried out by the edit processing unit 23. Depending on the presence or absence of the command "trsfm( )," the drive deck editor of FIG. 1 determines whether the material data file is to be copied or edited.

In the EPL data file of FIG. 8, an EPL data item D8-1 specifies that the material data file f1 be pasted as the scene #1 into a complete package data file; an EPL data item D8-2 specifies that the material data file f2 be pasted as the scene #2 into the complete package data file; an EPL data item D8-3 designates an edit process; and an EPL data item D8-4 specifies that the material data items f3-1, f3-2, f3-3 and f3-4 in the material data file f3 be pasted as the scene #3 into the complete package data file.

To paste the material data items f3-1, f3-2, f3-3 and f3-4 from the material data file f3 into the complete package data file as the scene #3 requires searching the data file f3 for the items f3-1, f3-2, f3-3 and f3-4 and then cutting the four detected data items. These editing actions are designated in the EPL data item D8-3. An EPL data item D8-5 specifies that the material data file f4 be pasted as the scene #4 into the complete package data file.

Figure 9:
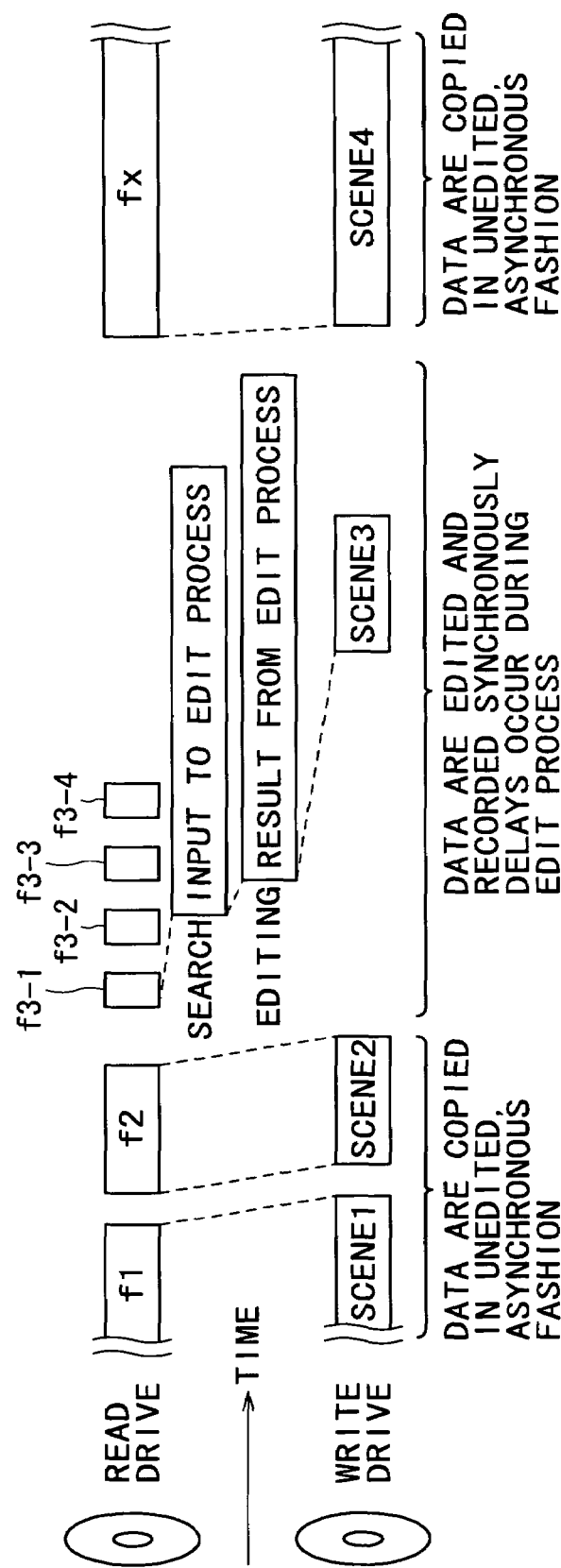
FIG. 9 is an explanatory view of processing based on the EPL data file of FIG. 8.

The EPL data file shown in FIG. 8 causes the drive deck editor of FIG. 1 to carry out the processes outlined in FIG. 9. Specifically, in accordance with the EPL data item D8-1, the material data file f1 is reproduced by the read drive and transferred as the scene #1 to the write drive for recording. In keeping with the EPL data item D8-2, the material data file f2 is reproduced by the read drive and transferred as the scene #2 to the write drive for recording. Since neither the EPL data item D8-1 nor the data item D8-2 contains the command "trsfm( )" designating an edit process by the edit processing unit 23, the material data files f1 and f2 are not subject to editing by the unit 23. That is, the material data files f1 and f2 are transferred from the read drive to the write drive in an asynchronous manner.

After the scene #2 is recorded by the write drive, the material data file f3 is reproduced by the read drive in accordance with the EPL data items D8-3 and D8-4. Also in keeping with the same EPL data items, the edit processing unit 23 searches the material data file f3 for the material data items f3-1, f3-2, f3-3 and f3-4, cuts the four detected items from the file f3, and transfers the cut items as one continuous scene #3 to the write drive for recording. In this case, the EPL data item D8-3 contains the command "trsfm( )" designating the edit process by the edit processing unit 23. Thus the transfer of the material data file f3 from the read drive to the edit processing unit 23 is accomplished synchronously, and so is the transfer of the scene #3 from the edit processing unit 23 to the write drive.

After the scene #3 is recorded by the write drive, the material data file f4 is reproduced by the read drive and transferred as the scene #4 to the write drive for recording in accordance with the EPL data item D8-5. Since the EPL data item D8-4 does not include a command "trsfm( )" designating an edit process by the edit processing unit 23, the material data file f4 is not subject to editing by the unit 23. That is, the material data file f4 is transferred asynchronously from the read drive to the write drive.

In the example shown in FIGS. 7 through 9, as described above, the scene #3 is processed synchronously between the read drive, write drive, and edit processing unit 23, while the scenes #1, #2 and #4 are processed asynchronously between the read drive and the write drive at high speed. This makes it possible to reduce the total time required to produce the complete package data file.

Suppose now that, as shown in FIG. 10, there exist two read drives #1 and #2; that an optical disc 11 loaded in one read drive #1 has material data files f1 through f4 recorded thereon, while an optical disc 11 loaded in the other read drive #2 has material data files f1' through f3' stored thereon; and that a write drive is provided to record to a loaded optical disc 11 the complete package data composed of AV data including: a scene #1 from the material data file f1; a scene #2 from the material data f2; part of a scene #3 made of material data items f3-1, f3-2 and f3-3 from three segments of the material data file f3; the remaining part of the scene #3 made of material data items f1'-1, f1'-2 and f1'-3 from three segments of the material data file f1'; a scene #4 from the material data file f2'; and a scene #5 from the material data file f3'. In such a case, an EPL data file such as one shown in FIG. 11 is employed.

In the EPL data file of FIG. 11, an EPL data item D11-1 specifies that the material data file f1 be pasted as the scene #1 into a complete package data file; an EPL data item D11-2 specifies that the material data file f2 be pasted as the scene #2 into the complete package data file; an EPL data item D11-3 designates an edit process; and an EPL data item D11-4 specifies that the material data items f3-1, f3-2 and f3-3 in the material data file f3 be pasted as part of the scene #3 into the complete package data file.

To paste the material data items f3-1, f3-2 and f3-3 from the material data file f3 into the complete package data file as part of the scene #3 requires searching the data file f3 for the items f3-1, f3-2 and f3-3 and then cutting the three detected data items. These editing actions are designated in the EPL data item D11-3.

An EPL data item D11-5 designates an edit process. An EPL data item D11-6 specifies that the material data files f1'-1, f1'-2 and f1'-3 in the material data file f1' be pasted into the complete package data file as the remaining part of the scene #3.

An EPL data item D11-7 specifies that the material data file f2' be pasted as the scene #4 into the complete package data file. An EPL data item D11-8 specifies that the material data file f3' be pasted as the scene #5 into the complete package data file.

The EPL data file shown in FIG. 11 causes the drive deck editor of FIG. 1 to carry out the processes outlined in FIG. 12. Specifically, in accordance with the EPL data item D11-1, the material data file f1 is reproduced by the read drive #1 and transferred as the scene #1 to the write drive for recording. In keeping with the EPL data item D11-2, the material data file f2 is reproduced by the read drive #1 and transferred as the scene #2 to the write drive for recording. Since neither the EPL data item D11-1 nor the data item D11-2 contains the command "trsfm( )" designating an edit process, the material data files f1 and f2 are not subject to editing. That is, the material data files f1 and f2 are transferred from the read drive #1 to the write drive in an asynchronous manner.

After the scene #2 is recorded by the write drive, the material data file f3 is reproduced by the read drive #1 in accordance with the EPL data items D11-3 and D11-4. Also in keeping with the same EPL data items, the edit processing unit 23 searches the material data file f3 for the material data items f3-1, f3-2 and f3-3, cuts the three detected items from the file f3, and transfers the cut items as part of one continuous scene #3 to the write drive for recording. In this case, the EPL data item D11-3 contains the command "trsfm( )" designating the edit process. Thus the transfer of the material data file f3 from the read drive #1 to the edit processing unit 23 is accomplished synchronously, and so is the transfer of part of the scene #3 from the edit processing unit 23 to the write drive.

In accordance with the EPL data items D11-5 and D11-6, the material data file f2' is reproduced by the read drive #2. Also in keeping with the EPL data items D11-5 and D11-6, the edit processing unit 23 searches the material data file f2' for the material data items f1'-1, f1'-2 and f1'-3, cuts the three detected data items from the file f2', and transfers the cut items as the remaining part of one continuous scene #3 to the write drive for recording. In this case, the EPL data item D11-5 contains the command "trsfm( )" designating the edit process. Thus the transfer of the material data file f1' from the read drive #2 to the edit processing unit 23 is accomplished synchronously, and so is the transfer of the remaining part of the scene #3 from the edit processing unit 23 to the write drive.

After the scene #3 is recorded by the write drive, the material data file f2' is reproduced by the read drive #2 and transferred as the scene #4 to the write drive for recording in accordance with the EPL data item D11-7. In keeping with the EPL data D11-8, the material data file f3' is reproduced by the read drive #2 and transferred as the scene #5 to the write drive for recording. Since neither the EPL data item D11-7 nor the item D11-8 contains a command "trsfm( )" designating an edit process, the material data files f2' and f3' are not subject to editing. That is, the material data files f2' and f3' are transferred asynchronously from the read drive #2 to the write drive.

In the example shown in FIGS. 10 through 12, as described above, the scene #3 is processed synchronously between the read drives, write drive, and edit processing unit 23, while the scenes #1, #2, #4 and #5 are processed asynchronously between the read drives and the write drive at high speed. This makes it possible to reduce the total time required to produce the complete package data file.

Figure 13:
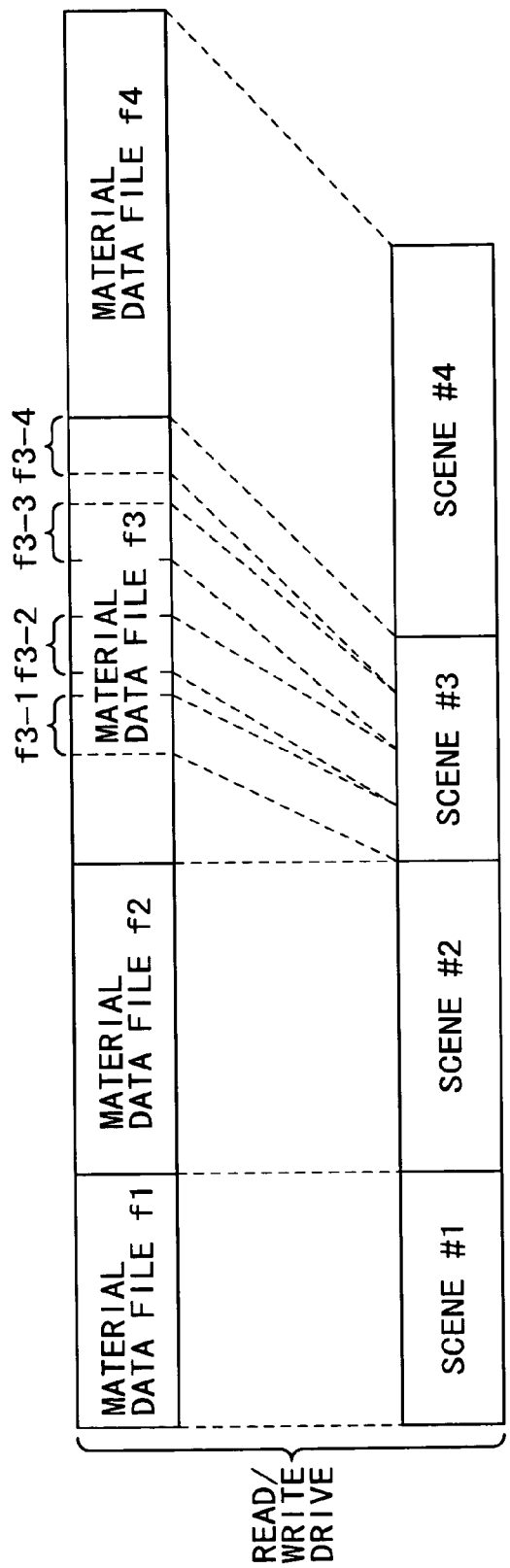
FIG. 13 is a schematic view depicting other material data files and a complete package data file.

Suppose now that, as shown in FIG. 13, an optical disc 11 loaded in a read drive has material data files f1 through f4 recorded thereon, and that a write drive is used to record to a loaded optical disc 11 the complete package data composed of AV data including: a scene #1 from the material data file f1; a scene #2 from the material data f2; a scene #3 made of material data items f3-1, f3-2, f3-3 and f3-4 from four segments of the material data file f3; and a scene #4 from the material data file f4. In such a case, an EPL data file such as one shown in FIG. 14 is utilized. For the setup in FIG. 13, the same drive is used as both the read drive and the write drive.

In the EPL data file of FIG. 14, an EPL data item D14-1 specifies that the material data file f1 be pasted as the scene #1 into a complete package data file; an EPL data item D14-2 specifies that the material data file f2 be pasted as the scene #2 into the complete package data file; an EPL data item D14-3 designates an edit process; and an EPL data item D14-4 specifies that the material data items f3-1, f3-2, f3-3 and f3-4 in the material data file f3 be pasted as the scene #3 into the complete package data file.

To paste the material data items f3-1, f3-2, f3-3 and f3-4 from the material data file f3 into the complete package data file as the scene #3 requires searching the data file f3 for the items f3-1, f3-2, f3-3 and f3-4 and then cutting the four detected data items. These editing actions are designated in the EPL data item D14-3. An EPL data item D14-5 specifies that the material data file f4 be pasted as the scene #4 into the complete package data file.

The EPL data file shown in FIG. 14 causes the drive deck editor of FIG. 1 to carry out the processes outlined in FIG. 15. Specifically, in accordance with the EPL data item D14-1, the material data file f1 is reproduced by the read drive and transferred as the scene #1 to the write drive for recording, the write drive being the same as the read drive. In keeping with the EPL data item D14-2, the material data file f2 is reproduced by the read drive and transferred as the scene #2 to the write drive for recording. Since neither the EPL data item D14-1 nor the data item D14-2 contains the command "trsfm( )" designating an edit process, the material data files f1 and f2 are not subject to editing. That is, the material data files f1 and f2 are transferred from the read drive to the write drive in an asynchronous manner.

After the scene #2 is recorded by the write drive, the material data file f3 is reproduced by the read drive in accordance with the EPL data items D14-3 and D14-4. Also in keeping with the same EPL data items, the edit processing unit 23 searches the material data file f3 for the material data items f3-1, f3-2, f3-3 and f3-4, cuts the four detected items from the file f3, and transfers the cut items as one continuous scene #3 to the write drive for recording. In this case, the EPL data item D14-3 contains the command "trsfm( )" designating the edit process. Thus the transfer of the material data file f3 from the read drive to the edit processing unit 23 is accomplished synchronously, and so is the transfer of the scene #3 from the edit processing unit 23 to the write drive.

After the scene #3 is recorded by the write drive, the material data file f4 is reproduced by the read drive and transferred as the scene #4 to the write drive for recording in accordance with the EPL data item D14-5. Since the EPL data item D14-4 does not include the command "trsfm( )" designating an edit process, the material data file f4 is not subject to editing. That is, the material data file f4 is transferred asynchronously from the read drive to the write drive.

In the example shown in FIGS. 13 through 15, as in the example illustrated in FIGS. 7 through 9, the scene #3 is processed synchronously between the read drive, write drive, and edit processing unit 23, while the scenes #1, #2 and #4 are processed asynchronously between the read drive and the write drive at high speed. This makes it possible to reduce the total time required to produce the complete package data file.

In the example of FIGS. 13 through 15, the same drive serves as both the read drive and the write drive. For that reason, the transfer of material data files can be accomplished at an even higher speed within the same drive without the intervention of the switcher.

Suppose now that, as shown in FIG. 16, an optical disc 11 loaded in a read drive has material data files f1 through f4 recorded thereon, and that a write drive is used to record to a loaded optical disc 11 the complete package data composed of AV data including: a scene #1 from the material data file f1; a scene #2 from the material data f3; a scene #3 from the material data file f2; and a scene #4 from the material data file f4. In such a case, an EPL data file such as one shown in FIG. 17 is employed.

In the EPL data file of FIG. 17, an EPL data item D17-1 specifies that the material data file f1 be pasted as the scene #1 into a complete package data file; an EPL data item D17-2 specifies that the material data file f3 be pasted as the scene #2 into the complete package data file; an EPL data item D17-3 specifies that the material data file f2 be pasted as the scene #3 into the complete package data file; and an EPL data item D17-4 specifies that the material data file f4 be pasted as the scene #4 into the complete package data file.

Figure 18:
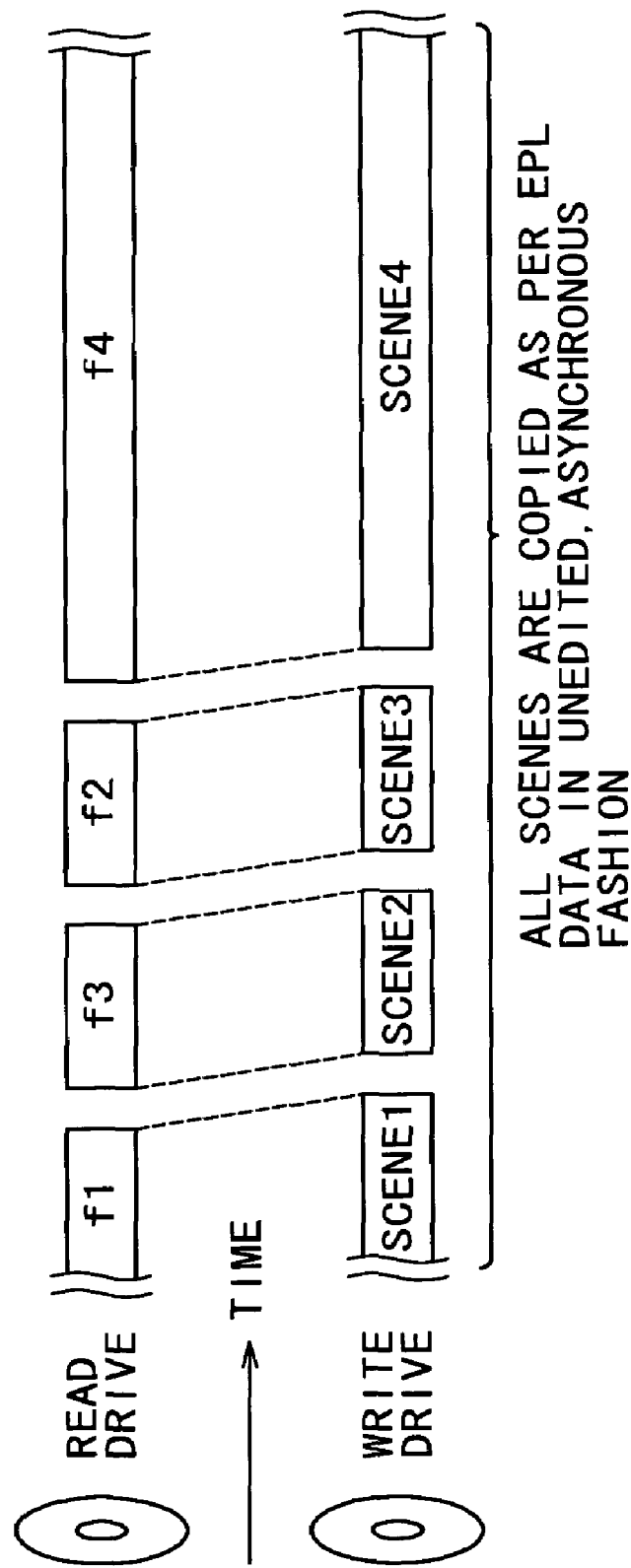
FIG. 18 is an explanatory view of processing based on the EPL data file of FIG. 17.

The EPL data file shown in FIG. 17 causes the drive deck editor of FIG. 1 to carry out the processes outlined in FIG. 18. Specifically, in accordance with the EPL data item D17-1, the material data file f1 is reproduced by the read drive and transferred as the scene #1 to the write drive for recording. In keeping with the EPL data item D17-2, the material data file f3 is reproduced by the read drive and transferred as the scene #2 to the write drive for recording. In accordance with the EPL data item D17-3, the material data file f2 is reproduced by the read drive and transferred as the scene #3 to the write drive for recording. In keeping with the EPL data item D17-4, the material data file f4 is reproduced by the read drive and transferred as the scene #4 to the write drive for recording. Since none of the EPL data items D17-1 through D17-4 contains the command "trsfm( )" designating an edit process, the material data files f1 through f4 are not subject to editing. That is, the material data files f1 through f4 are transferred from the read drive to the write drive in an asynchronous manner.

In the example shown in FIGS. 16 through 18, as described above, all the scenes #1 through #4 are processed asynchronously between the read drive and the write drive at high speed. This makes it possible to reduce the total time required to produce the complete package data file. Where the AV data of all the scenes constituting a complete package data file are transferred asynchronously between the read drive and the write drive, as in the preceding example, it takes the shortest possible time to produce the complete package data file.

Suppose now that, as shown in FIG. 19, an optical disc 11 loaded in a read drive has material data files f1 through f3 recorded thereon, and that a write drive is used to record to a loaded optical disc 11 the complete package data composed of AV data including: a scene #1 made of material data items f1-1, f1-2, f1-3 and f1-4 from four segments of the material data file f1; a scene #2 composed of material data items f2-1, f2-2, f2-3 and f2-4 from four segments of the material data f2; and a scene #3 constituted by material data items f3-1, f3-2, f3-3 and f3-4 from four segments of the material data file f3. In such a case, an EPL data file such as one shown in FIG. 20 is utilized.

In the EPL data file of FIG. 20, an EPL data item D20-1 designates an edit process; an EPL data item D20-2 specifies that the material data items f1-1, f1-2, f1-3 and f1-4 in the material data file f1 be pasted as the scene #1 into a complete package data file; an EPL data item D20-3 designates an edit process; an EPL data item D20-4 specifies that the material data items f2-1, f2-2, f2-3 and f2-4 in the material data file f2 be pasted as the scene #2 into the complete package data file; an EPL data item D20-5 designates an edit process; and an EPL data item D20-6 specifies that the material data items f3-1, f3-2, f3-3 and f3-4 in the material data file f3 be pasted as the scene #3 into the complete package data file.

To paste the material data items f1-1, f1-2, f1-3 and f1-4 from the material data file f1 into the complete package data file as the scene #1 requires searching the data file f1 for the items f1-1, f1-2, f1-3 and f1-4 and then cutting the four detected data items. These editing actions are designated in the EPL data item D20-1. The same editing actions are also specified in the EPL data items D20-3 and D20-5 each.

The EPL data file shown in FIG. 20 causes the drive deck editor of FIG. 1 to carry out the processes outlined in FIG. 21. Specifically, in accordance with the EPL data items D20-1 and 20-2, the material data file f1 is reproduced by the read drive. Also in keeping with the EPL data items D20-1 and D20-2, the edit processing unit 23 searches the material data file f1 for the material data items f1-1, f1-2, f1-3 and f1-4, cuts the four detected items from the file f1, and transfers the cut items as one continuous scene #1 to the write drive for recording. In this case, the EPL data item D20-1 contains the command "trsfm( )" designating the edit process. Thus the transfer of the material data file f1 from the read drive to the edit processing unit 23 is accomplished synchronously, and so is the transfer of the scene #1 from the edit processing unit 23 to the write drive.

After the scene #1 is recorded by the write drive, the material data file f2 is reproduced by the read drive in accordance with the EPL data items D20-3 and D20-4. Also in keeping with the same EPL data items, the edit processing unit 23 searches the material data file f2 for the material data items f2-1, f2-2, f2-3 and f2-4, cuts the four detected items from the file f2, and transfers the cut items as one continuous scene #2 to the write drive for recording. In this case, the EPL data item D20-3 contains the command "trsfm( )" designating the edit process. Thus the transfer of the material data file f2 from the read drive to the edit processing unit 23 is accomplished synchronously, and so is the transfer of the scene #2 from the edit processing unit 23 to the write drive.

After the scene #2 is recorded by the write drive, the material data file f3 is reproduced by the read drive in accordance with the EPL data items D20-5 and D20-6. Also in keeping with the same EPL data items, the edit processing unit 23 searches the material data file f3 for the material data items f3-1, f3-2, f3-3 and f3-4, cuts the four detected items from the file f3, and transfers the cut items as one continuous scene #3 to the write drive for recording. In this case, the EPL data item D20-5 contains the command "trsfm( )" designating the edit process. Thus the transfer of the material data file f3 from the read drive to the edit processing unit 23 is accomplished synchronously, and so is the transfer of the scene #3 from the edit processing unit 23 to the write drive.

In the example of FIGS. 19 through 21, as described, all the scenes #1 through #3 are processed synchronously between the read drive, write drive, and edit processing unit 23. In other words, there is no scene processed asynchronously between the read drive and the write drive. That means the benefit of high-speed processing, made available in the earlier examples, is not derived here from the asynchronous processing between the read drive and the write drive. It follows that the setup of the example in FIGS. 19 through 21 takes as much time in producing the complete package data file as in conventional cases.

The series of steps described above may be executed by hardware or by software. For software-based processing to take place, programs constituting processing sequences may be installed from a suitable storage medium into a general-purpose computer or like equipment capable of executing the programs.

FIG. 22 shows a typical structure of a computer which embodies the invention and in which the programs for executing the series of steps above are installed. The programs may be recorded beforehand on a hard disc 105 or in a ROM (read only memory) 103 which is a built-in storage medium in the computer. Alternatively, the programs may retained (recorded) temporarily or permanently on a removable storage medium 111 such as flexible disks, CD-ROMs (compact disc read only memories) MOs (magneto-optical discs), DVDs (digital versatile discs), magnetic discs, or semiconductor memories. The removable storage medium 111 may be offered as so-called package software.

Besides being installed from the removable storage medium 111 into the computer, the programs may also be installed after being transferred in wired or wireless fashion from a download site over digital satellite broadcast links, local area networks (LANs), or the Internet. The programs thus transferred may be received through a communication unit 108 of the computer and installed onto the built-in hard disc 105.

The computer incorporates a CPU (central processing unit) 102. The CPU 102 connects via a bus 101 to an I/O interface 110. The user enters commands into the CPU 102 by operating an input unit 107 made up of a keyboard, a mouse, a microphone and the like. Given the commands, the CPU 102 executes the appropriate programs in the ROM 103 accordingly. Alternatively, the CPU 102 may first load into a RAM (random access memory) 104 any one of three kinds of programs: programs held on the hard disc 105; programs which were transferred over satellite links or through a wired network and received by the communication unit 108 before being installed on the hard disc 105; or programs which were retrieved from the removable storage medium 111 loaded in a drive 109 and installed onto the hard disc 105. Then the CPU 102 may execute the loaded programs in the RAM 104 to carry out the processing steps outlined in the flowcharts and block diagrams discussed above. The result of the processing is forwarded through the I/O interface 110 to an output unit 106 composed of an LCD (liquid crystal display) or speakers for output, to the communication unit 108 for transmission to the outside, or to the hard disc 105 for recording thereon.

In this specification, the processing steps which describe the programs for causing the computer to perform diverse operations may not represent only the processes that are to be carried out in the depicted sequence in the flowcharts (i.e., on a time series basis); the steps may also represent processes that are conducted parallelly or individually (e.g., in parallel or object-oriented fashion).

The programs may be processed by a single computer, by a plurality of computers in distributed fashion, or by a remote computer or computers after being transferred thereto.

As many apparently different embodiments of this invention may be made without departing from the spirit and scope thereof, it is to be understood that the invention is not limited to the specific embodiments thereof except as defined in the appended claims.

What is claimed is:

1. A data processing apparatus for processing audio visual data made up of video and audio data, said data processing apparatus comprising;

receiving means for receiving edit procedure data including an edit command specifying how to edit said audio visual data and whether said audio visual data is to be edited synchronously or asynchronously;

analyzing means for analyzing said edit procedure data to recognize whether the edit command is a synchronous or asynchronous edit command in the edit procedure data;

editing means for editing said audio visual data synchronously or asynchronously in accordance with said edit command;

determining means for determining when said edit command specifies an asynchronous command for coping of said audio visual data and for determining when said edit command specifies a synchronous command for editing said audio visual data;

at least one recording/reproducing means having a recording medium for recording audio visual data on or reproducing audio visual data from said recording medium; and controlling means which, when said edit command is determined to be an asynchronous copy command, then transfers said audio visual data from a copy source formed by at least one of said recording/reproducing means to a copy destination formed by either the same or another of said recording/reproducing means, without synchronizing the two recording/reproducing means and the editing means in operation; and when said edit command is determined to specify a synchronous editing action, then transfers the unedited audio visual data reproduced from said at least one recording/reproducing means to said editing means for the specified synchronous editing action, and transfers the thus-edited audio visual data coming from said editing means to either the same or another of said recording/reproducing means for storage therein, while synchronizing said editing means and the two recording/reproducing means in operation.

2. A data processing apparatus according to claim 1, wherein said at least one recording/reproducing means is incorporated in the apparatus.

3. A data processing apparatus according to claim 1, wherein said at least one recording/reproducing means is capable of recording or reproducing said audio visual data to or from a randomly accessible storage medium.

4. A data processing apparatus according to claim 1, wherein said edit command is recorded on a storage medium and reproduced therefrom by said at least one recording/reproducing means; and wherein said receiving means receives said edit command reproduced from said storage medium.

5. A data processing method for processing audio visual data made up of video and audio data, said data processing method comprising the steps of:

receiving edit procedure data including an edit command specifying how to edit said audio visual data and whether said audio visual data is to be edited synchronously or asynchronously;

analyzing said edit procedure data to recognize whether the edit command is a synchronous or asynchronous edit command in the edit procedure data;

editing said audio visual data synchronously or asynchronously in accordance with said edit command using editing means;

determining when said edit command specifies an asynchronous command for coping of said audio visual data and for determining when said edit command specifies a synchronous command for editing said audio visual data;

when said edit command is determined to be an asynchronous copy command, then transferring said audio visual data from a copy source formed by one of at least one recording/reproducing means for recording or reproducing said audio visual data, to a copy destination formed by either the same or another recording/reproducing means, without synchronizing the two recording/reproducing means and the editing means in operation; and when said edit command is determined to specify a synchronous editing action, then transferring the unedited audio visual data reproduced from one of said at least one recording/reproducing means to said editing means for the specified synchronous editing action, and transferring the thus-edited audio visual data coming from said editing means to either the same or another of recording/reproducing means for storage therein, while synchronizing said editing means and the two recording/reproducing means in operation.

6. A program embedded in a computer-readable storage medium for causing a computer to execute a data processing method for processing audio visual data made up of video and audio data, said data processing method comprising the steps of:

analyzing edit procedure data to recognize whether the edit command included therein is a synchronous or asynchronous edit command;

editing said audio visual data synchronously or asynchronously in accordance with said edit command specifying how to edit said audio visual data, using editing means;

determining when said edit command specifies an asynchronous command for coping of said audio visual data and for determining when said edit command specifies a synchronous command for editing said audio visual data;

when said edit command is determined to be an asynchronous copy command, then transferring said audio visual data from a copy source formed by one of at least one recording/reproducing means for recording or reproducing said audio visual data, to a copy destination formed by either the same or another recording/reproducing means, without synchronizing the two recording/reproducing means and the editing means in operation; and when said edit command is determined to specify a synchronous editing action, then transferring the unedited audio visual data reproduced from one of said at least one recording/reproducing means to said editing means for the specified synchronous editing action, and transferring the thus-edited audio visual data coming from said editing means to either the same or another of recording/reproducing means for storage therein, while synchronizing said editing means and the two recording/reproducing means in operation.

* * * * *

UNITED STATES PATENT AND TRADEMARK OFFICE
CERTIFICATE OF CORRECTION

PATENT NO. : 7,526,724 B2
APPLICATION NO. : 10/620085
DATED : April 28, 2009
INVENTOR(S) : Minoru Kawahara et al.

Page 1 of 1

It is certified that error appears in the above-identified patent and that said Letters Patent is hereby corrected as shown below:

On The Title page Add

Item
 --(30)   Foreign Application Priority Data

July 17, 2002     JP     2002-207836.--

Signed and Sealed this

Fourteenth Day of July, 2009

JOHN DOLL
*Acting Director of the United States Patent and Trademark Office*